US008773808B2

(12) United States Patent
Iwashiro et al.

(10) Patent No.: US 8,773,808 B2
(45) Date of Patent: Jul. 8, 2014

(54) MAGNETIC DISK DEVICE AND HEAD-POSITION CONTROL METHOD

(75) Inventors: Masafumi Iwashiro, Tokyo (JP); Takao Abe, Tokyo (JP); Hiroshi Kubota, Tokyo (JP); Kazuhiko Takaishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/607,027

(22) Filed: Sep. 7, 2012

(65) Prior Publication Data

US 2013/0083424 A1    Apr. 4, 2013

(30) Foreign Application Priority Data

Sep. 29, 2011  (JP) ............................... P2011-215710
Apr. 27, 2012  (JP) ............................... P2012-104129

(51) Int. Cl.
G11B 21/02    (2006.01)
G11B 5/09    (2006.01)
G11B 5/596    (2006.01)

(52) U.S. Cl.
USPC ........................... 360/75; 360/65; 360/77.02

(58) Field of Classification Search
None
See application file for complete search history.

(56) References Cited

U.S. PATENT DOCUMENTS

| 6,417,982 | B1 * | 7/2002  | Ottesen et al. ............. 360/77.02 |
| 6,493,172 | B1   | 12/2002 | Morris et al. |
| 6,594,098 | B1 * | 7/2003  | Sutardja ........................ 360/65 |
| 6,768,607 | B2 * | 7/2004  | Ottesen et al. ............. 360/77.02 |
| 7,016,142 | B2   | 3/2006  | Jung et al. |
| 7,106,537 | B1 * | 9/2006  | Bennett .......................... 360/69 |
| 7,199,964 | B2 * | 4/2007  | Liu et al. ........................ 360/75 |
| 2011/0058276 | A1 | 3/2011 | Uchida et al. |

FOREIGN PATENT DOCUMENTS

| JP | 07-098948   | 4/1995  |
| JP | 2002-287831 | 10/2002 |
| JP | 2011-118980 | 6/2011  |

OTHER PUBLICATIONS

Japan Society of Mechanical Engineers, "Dynamics and Control of the Information Equipment", Nov. 15, 1996, p. 217,3 pages.
Hiroshi Okamura et al., CQ Publishing Co., Ltd., "Structure and Application of a Hard Disk Drive", Jan. 1, 2002, p. 86, 3 pages.

* cited by examiner

*Primary Examiner* — K. Wong
(74) *Attorney, Agent, or Firm* — Patterson & Sheridan, LLP

(57) ABSTRACT

A magnetic disk device includes a magnetic disk on which servo information is recorded, a head to read the servo information of the magnetic disk, and a position control module. When carrying out positioning control of the head, the position control module estimates frequency components of noise in a head positioning control process, using a high-order digital filter that includes first and second variable coefficients that are each based on position error information generated from the servo information read by the head.

17 Claims, 18 Drawing Sheets

FREQUENCY (Hz)

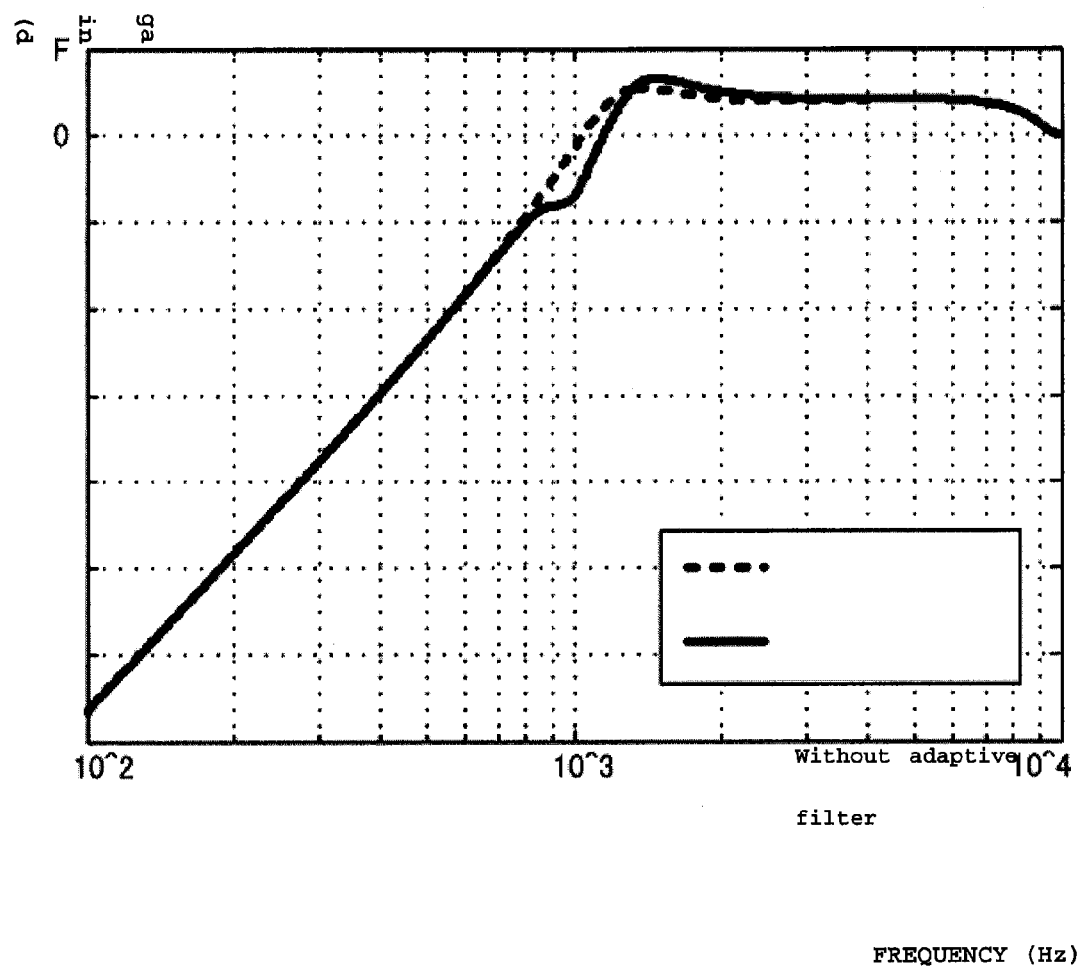

MAGNETIC DISK DEVICE AND HEAD-POSITION CONTROL METHOD

CROSS-REFERENCE TO RELATED APPLICATION

This application is based upon and claims the benefit of priority from Japanese Patent Application No. 2012-104129, filed Apr. 27, 2012 and Japanese Patent Application No. 2011-215710, filed Sep. 29, 2011; the entire contents of which are incorporated herein by reference.

FIELD

Embodiments described herein relate to a magnetic disk device that controls a position of a head and a head-position control method.

BACKGROUND

In recent years, in head-position control of magnetic disks, feedback control has been applied to control a VCM (voice coil motor) that is to be controlled, based on filtered information of position error information of the head. Also, not only feedback control, but feed forward control may be added, based on frequency components of noise applied to a feedback control system. Furthermore, a resonance (suppression) filter may also be added in order to suppress resonant frequency components, which occur in mechanical components that constitute a part of the feedback control system. For the filtering needed in this kind of head-position control, an adaptive filter is used.

Generally, it has been common to use FFT to estimate the frequency components of the noise in the feedback control system or the resonant frequency components that occur in the mechanical components of a system. Also, while there have been many instances where the filtering of the head-position control is realized in software, it has not be easy to realize FFT in software. Also, when FFT is realized in hardware, there has been the problem of an increase in cost or an increase in the on-chip die area. That is, it has been difficult to configure the adaptive filter that could be used during feedback control of the head-position, etc.

Therefore, according to embodiments described herein, there is provided a magnetic disk device and head-position control method in which it is possible to easily configure the adaptive filter during feedback control.

DESCRIPTION OF THE DRAWINGS

FIG. 6 is a graph showing closed loop characteristics (sensitivity characteristics) of a feedback control system, containing the adaptive filter, according to the first embodiment.

DETAILED DESCRIPTION

Multiple examples will be described below using diagrams.

The magnetic disk device of this embodiment is equipped with a magnetic disk on which servo information is recorded, a head to read the servo information of the magnetic disk, and a position control module. When carrying out head positioning control, which is based on position error information generated from the servo information read by the head, the position control module estimates the predetermined frequencies which will be the noise in positioning control, using a high-order infinite impulse response (IIR) digital filter containing variable coefficients. The variable coefficients are based on position error information generated from the servo information read by the head.

Embodiment 1

Figure 1:
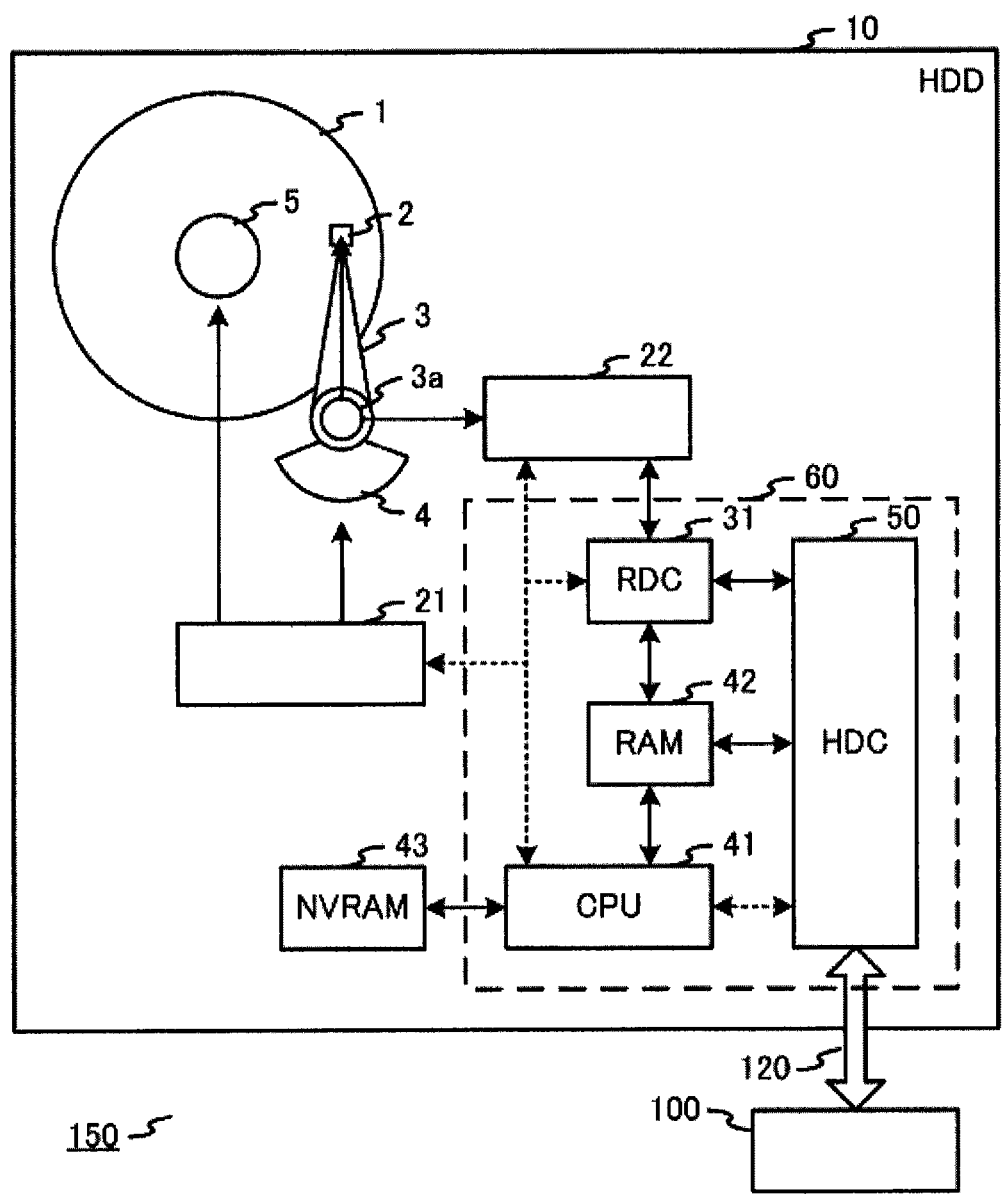
FIG. 1 is a block diagram showing a configuration of an electronic equipment that includes a magnetic disk device (HDD) according to a first embodiment.

FIG. 1 is a block diagram that shows a configuration of electronic equipment 150 that includes a magnetic disk device (also known as HDD below) 10 according to this first embodiment. The electronic equipment 150 is also equipped with a host device 100. The HDD 10 connects to the host device 100 via a communication medium (host I/F) 120, and functions as a memory module of the host device 100. The host I/F 120 connects the host device 100 and the HDD 10, and is utilized for communication related to sending and receiving data and commands between the host device 100 and HDD 10. For example, the electronic equipment 150 is a personal computer, and the host device 100 is a chipset IC provided in the personal computer.

In this first embodiment, while the HDD 10 will be presented as an example, it is also possible to apply the configuration of this first embodiment in feedback control devices which carry out position control and speed control, based on feedback control, for other devices, including optical disk drives, MO drives, MD drives, digital cameras (for shake suppression), etc.

The HDD 10 includes the following mechanical components: a magnetic disk 1, a slider 2, an arm 3, a VCM (Voice Coil Motor) 4 and an SPM (spindle motor) 5. The HDD 10 also possesses circuit blocks of a motor driver 21, a head IC 22, an NVRAM 43 and a controller 60, etc. The controller 60 contains a Read Write Channel (also known as RDC below) 31, a CPU 41, a RAM 42, and an HDC (Hard Disc controller) 50.

In the HDD 10 according to this first embodiment, position control of the head (not shown) equipped in the slider 2 is carried out based on the servo information recorded in the magnetic disk 1. For position control of the head, feedback control is applied. During this feedback control, position error information is calculated based on the servo information read from the magnetic disk 1 by the head (not shown) and on target position information, which will be a control target position during the feedback control. The calculated position error information is processed by a filter. In this first embodiment, the calculated position error information is filtered using an adaptive filter. The adaptive filter, which is one of the characteristic configurations of this first embodiment, can adaptively estimate and suppress random frequency components of the noise without using FFT.

The magnetic disk 1 is fixed to the SPM 5, and rotates due to the rotational force of the SPM 5. At least one surface of the magnetic disk 1 is a recording surface in which information is recorded magnetically. That is, the magnetic disk 1 is a magnetic recording medium. On the recording surface, for example, tracks of multiple concentric circles are defined, and each track has a servo area and a data area. The servo information containing physical address information on the recording surface of the magnetic disk 1, and the position information for calculating the displacement in the radial direction with respect to the center of the track, is recorded in the servo area. Also, the information to be recorded in the HDD 10 is recorded in the data area.

The slider 2 is provided at the end of the arm 3 in order to interact with the recording surface of the magnetic disk 1. The slider 2 includes a read head (not shown) and a write head (not shown). The read head (not shown) reads the magnetically recorded signal on the recording surface of the magnetic disk 1. The signal that is read is output to the head IC 22 via a conduction pattern on arm 3. The write head (not shown) performs magnetic recording on the recording surface of the magnetic disk 1, depending on the write signal (write current) that is input from the head IC 22 via the conduction pattern on the arm 3.

The arm 3 includes the slider 2 at one end and a bearing 3a at the other end. Depending on the driving current supplied to the VCM 4, the arm 3 rotates around the approximate center of a bearing 3a, and moves the slider 2 in a radial direction on the recording surface of the magnetic disk 1.

The VCM 4 is driven depending on the driving signal (current) supplied from the motor driver 21, and it rotates the arm 3.

The SPM 5 is driven depending on the driving signal (current) supplied from the motor driver 21, and it rotates the magnetic disk 1.

Depending on the control signal from the controller 60 (more specifically from the CPU 41), the motor driver 21 supplies a driving signal (current) for driving the VCM 4 to the VCM 4 and the driving signal (current) for driving the SPM 5 to the SPM 5.

The head IC 22 amplifies the signal, which is input from the read head (not shown in the figure) equipped in the slider 2, via the conduction pattern on the arm 3, and outputs the amplified signal as read information to the controller 60 (more specifically to the RDC 31). Also, the head IC 22 outputs the write signal (write current), based on the recording information input from the controller 60 (RDC 31), to the write head (not shown in the figure) equipped in the slider 2, via the conduction pattern on the arm 3.

The controller 60 is designed as a SoC (System On Chip) containing the RDC 31, the CPU 41, the RAM 42 and the HDC 50, etc. In this first embodiment, the controller 60 carries out a position control process to control the radial displacement (position) of the read head (not shown), equipped in the slider 2, with respect to the center of the track, based on the servo information recorded in the magnetic disk 1. In addition, the controller 60 need not contain the RAM 42 and may also have a configuration in which the RAM 42 is connected externally to the controller 60.

The RDC 31 detects servo information corresponding to the servo area from the read information input from the head IC 22, and extracts the address information and position information from the detected servo information. The extracted address information and position information are output to the CPU 41. The RDC 31 also detects information corresponding to the data area from the read information, and decodes the detected information by applying a known process. The decoded information is output to the HDC 50. Furthermore, the RDC 31 encodes the information to be recorded, which is input from the HDC 50, by applying a given process, and outputs this encoded information as the recording information to the head IC 22. In order to carry out these multiple processes, the RDC 31 utilizes the RAM 42 as a work memory.

The CPU 41 is a processor that controls each block provided in the HDD 10, by executing the programs stored in the NVRAM 43. For example, the CPU 41 controls the operations of the position control process of the read head (not shown) corresponding to the recording surface of the magnetic disk 1, a rotation control process of the VCM 4 and SPM 5, and an information playback process from the magnetic disk 1. The CPU 41 executes the program for the controller 60 to operate as a servo controller or read write controller. The CPU 41 utilizes the RAM 42 as a work memory for the execution of such programs. In this first embodiment, when the controller 60 operates as the servo controller, the CPU 41 controls the operation of the position control process based on the address information and position information input from the RDC 31. The position control process is the feedback control that includes a filter process corresponding to the position error information. An adaptive filter realized by the execution of programs in the CPU 41 will be applied in this filter process. The adaptive filter of this first embodiment is configured without using FFT, and it can adaptively estimate the random frequency components of the noise corresponding to the position control process.

The RAM 42 is the work memory of the RDC 31, CPU 41 and the HDC 50. DRAM, which is a volatile memory, is used as the RAM 42.

The NVRAM 43 is a non-volatile memory for storing the programs to be executed by the CPU 41. The programs stored in the NVRAM 43 are updatable. The NVRAM 43 also stores the parameter values used in the processing executed in the CPU 41.

The HDC 50 executes the communication process to send and receive information between the host device 100 and the HDC 50. The HDC 50 encodes the decoded information from the RDC 31 by applying a given process on it, then sends the encoded information as send information to the host device 100. The HDC 50 also decodes the receive information received from the host device 100 by applying a given process on it, then outputs the decoded information, as the information to be recorded, to the RDC 31. For example, the HDC 50 executes a communication process with the host device 100 which conforms to the SATA (Serial Advanced Technology Attachment) standards. When the HDC 50 receives a write command containing logical address to start the data recording and a recording data length from the host device 100, it extracts information of the logical address and recording data length from the received write command. The extracted logical address and recording data length information is output to the CPU 41.

Due to such a configuration, by means of the multiple blocks provided in the HDD 10 according to this first embodiment, the position control process of the read head (not shown in the figure) for the recording surface of the magnetic disk 1 is executed by feedback control. In the position control process according to this first embodiment, the adaptive filter, realized by the programs executed in the CPU 41 which adaptively estimates the random frequency components of the noise corresponding to the position control process, is applied. Consequently, the HDD 10 according to this embodiment can easily configure the adaptive filter to suppress the noise of a predetermined frequency during feedback control.

Figure 2:
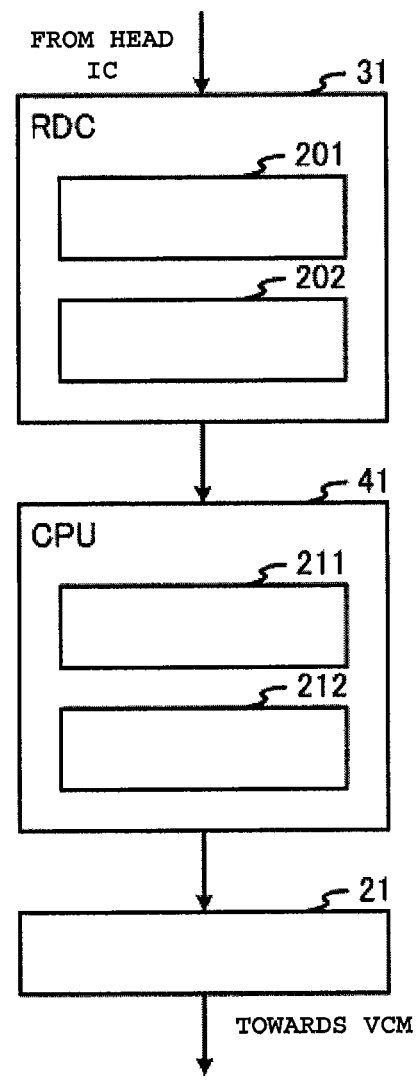
FIG. 2 is a configuration diagram for describing multiple blocks that execute position control of the head in the first embodiment.

Next, the multiple blocks that execute the position control process of the head in this first embodiment will be described using FIG. 2. FIG. 2 is a configuration diagram for describing the multiple blocks that execute the position control process of the head in this first embodiment.

The position control process of the head according to this first embodiment is executed by the multiple blocks, which include a signal processing component 201, a position detection component 202 provided in the RDC 31, an adaptive filter 211 and a fixed filter 212, which are software modules executing in the CPU 41, and the motor driver 21.

The read information from the head IC is input into the signal processing component 201 of the RDC 31. The signal processing component 201 applies the processes of demodulation or error correction, etc., to the read information that is input. The information that is processed in the signal processing component 201 is output to the position detection component 202. From the information output from the signal processing component 201, the position detection component 202 detects servo information, and extracts the address information and position information from the detected servo information. The extracted address information and position information are output to the CPU 41.

The address information and position information from the RDC 31 (more specifically, from the position detection component 202) are calculated as position error information at the CPU 41. The calculated position error information is input to the adaptive filter 211 of the CPU 41. The adaptive filter 211 is a filter that adaptively estimates the random frequency components of the noise corresponding to the position control process of the head, and is a software module realized by computations executed by the CPU 41. The adaptive filter 211 performs filter processing (filtering) on the characteristic properties corresponding to the estimated frequency components. The information filtered in the adaptive filter is output to the fixed filter 212. The fixed filter 212 is a filter for carrying out phase compensation or gain compensation to stabilize the feedback control in the position control process of the head, and is a software module realized by computations executed by the CPU 41. In order to realize a fixed filter 212, the filter coefficients for realizing the given transfer functions are set in advance. The information filtered in the fixed filter 212 is output to the motor driver 21.

The motor driver 21 rotationally drives the VCM 4, based on the information filtered in the adaptive filter 211 and fixed filter 212, and moves the slider 2 on the magnetic disk 1. The signal read from the recording surface of the magnetic disk 1 by the read head (not shown) equipped in the slider 2 is passed through the head IC to become read information, forming the feedback control in the position control process of the head.

In this manner, the position control process of the head is executed by the multiple blocks according to this first embodiment. The adaptive filter 211 and the fixed filter 212, which are a part of this position control process of the head, are configured in software modules. That is, the HDD 10 according to this first embodiment can easily configure the adaptive filter to suppress the noise of a predetermined frequency during feedback control.

Figure 3:
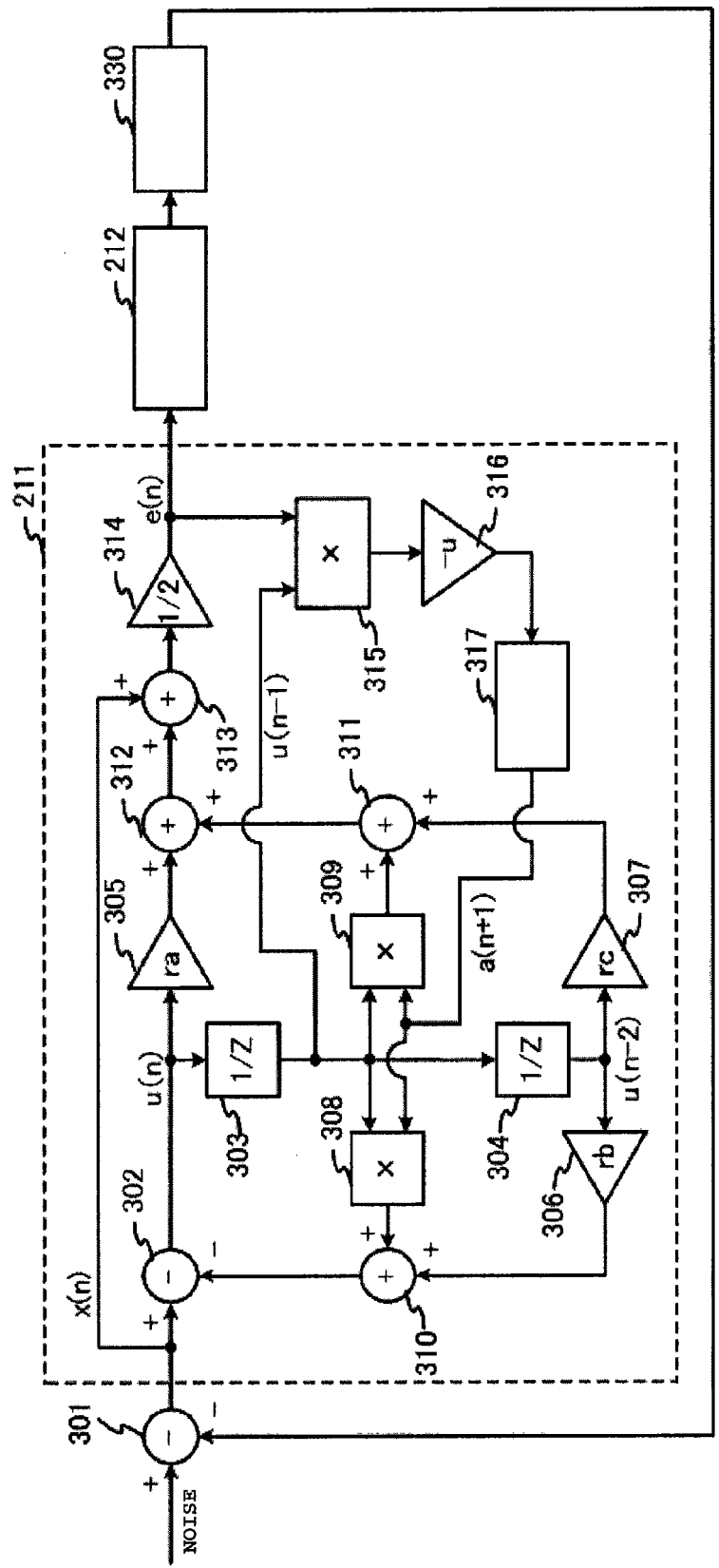
FIG. 3 is a block diagram for describing a configuration of an adaptive filter according to the first embodiment.

Next, the configuration of the adaptive filter 211 according to this first embodiment will be described using FIG. 3. FIG. 3 is a block diagram for describing the configuration of the adaptive filter 211 according to this first embodiment.

In FIG. 3, the schematic model of the entire feedback control system in the position control process of the head according to this first embodiment is displayed. In this feedback control system, the fixed filter 212 is provided in the subsequent stage of the adaptive filter 211, and a control target 330 is provided in the subsequent stage of the fixed filter 212. Also, the information output from the control target 330 is looped back and input to the adaptive filter 211. Since the control target 330 is the block from the motor driver 21 to the input of the adaptive filter 211, the information output from there is the position error information. In FIG. 3, the model is shown in which noise is added to the information obtained by inverting the polarity of the position error information.

The position error information to which noise has been added x (n) is input to a subtracter 302. A current value u (n), which is an output value of the subtracter 302, is input to a coefficient (ra) 305 and a delay device 303. The 1 delay value u (n−1) that has passed through the delay device 303 is input to multipliers 308, 309, a delay device 304 and a multiplier 315. The 2 delay value u (n−2) that has passed through the delay device 304 is input to a coefficient (rb) 306 and a coefficient (rc) 307. Also, an output value of a multiplier 308, and a value obtained by multiplying the 2 delay value u (n−2) and the coefficient (rb) 306, are added in an adder 310. An output value of the adder 310 is subtracted from the position error information to which noise has been added x (n), in the subtracter 302. Additionally, an output value of the multiplier 309, and a value obtained by multiplying the 2 delay value u (n−2) and the coefficient (rc) 307, are added in the adder 311. The output value of the adder 311 is added to the value obtained by multiplying the current value u (n) by the coefficient (ra) 305, in the adder 312. That is, a 2 Stage IIR type digital filter is configured based on these blocks.

In the subsequent stage of the 2 Stage IIR type digital filter, the output value of an adder 312, and the position error information to which noise has been added x (n), are added in an adder 313. An output value of the adder 313, is made ½ (0.5) times in a coefficient 314 and will be an output value e (n) of the adaptive filter. The output value e (n) of the adaptive filter is input to the fixed filter 212 and the multiplier 315. In the multiplier 315, the output value e (n) of the adaptive filter and the 1 delay value u (n−1) are multiplied. The value obtained by multiplying the output value of the multiplier 315 and the coefficient (−u) 316 is input to an integrator 317. An output value of the integrator 317, which is the feedback value a is input to each of the multipliers 308, 309 and is multiplied by the delay value u (n−1) in each of them.

Due to such a configuration, the output values of the multipliers 308, 309, which are a part of the coefficients of the 2 stage IIR type digital filter that is provided in the adaptive filter 211, are modified (updated) for every sample. That is, the adaptive filter 211 is configured as a sample value control system that determines (updates) the value to be output to the subsequent stage, in a predetermined time interval based on the sampling frequency. Also, since the characteristics of the 2 stage IIR type digital filter are determined by the coefficient (ra) 305, coefficient (rb) 306, coefficient (rc) 307, and the output values of the multipliers 308, 309, which change (update) for every sample, the characteristics of the adaptive filter 211 according to this first embodiment change for every sample.

Furthermore, while a configuration in which the fixed filter 212 is provided in the subsequent stage of the adaptive filter 211 has been described, it may also be a configuration in which the adaptive filter 211 is provided in the subsequent stage of the fixed filter 212.

That is, the HDD 10 according to this first embodiment, which is equipped with the adaptive filter 211 that is configured in software modules, can easily configure the adaptive filter to suppress the noise of a predetermined frequency during feedback control.

Figure 4A:
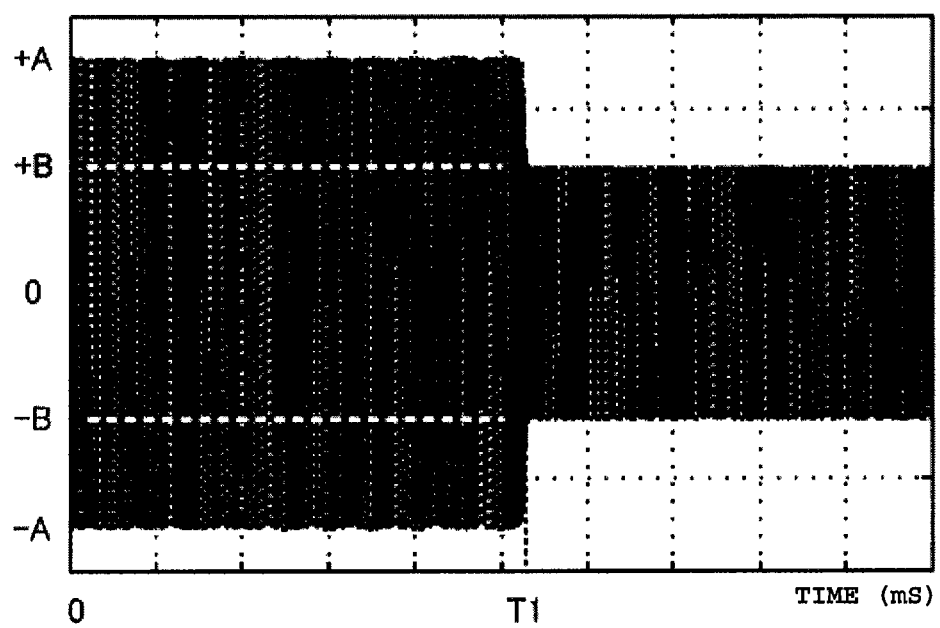
FIGS. 4A and 4B are graphs showing a change in position error information and filter coefficients relative to an elapsed time in the adaptive filter according to the first embodiment.

Next, the characteristics related to the adaptive filter 211, according to this first embodiment, are described using FIG. 4A to FIG. 6. FIGS. 4A and 4B are graphs that show the change in the position error information and filter coefficients with respect to the elapsed time in the adaptive filter 211 according to this first embodiment. FIGS. 5A and 5B are graphs that show the transfer characteristics of the adaptive filter 211 according to this first embodiment. FIG. 6 is a graph that shows the closed loop characteristics (sensitivity characteristics) of the feedback control system containing the adaptive filter 211 according to this first embodiment.

Figure 4B:
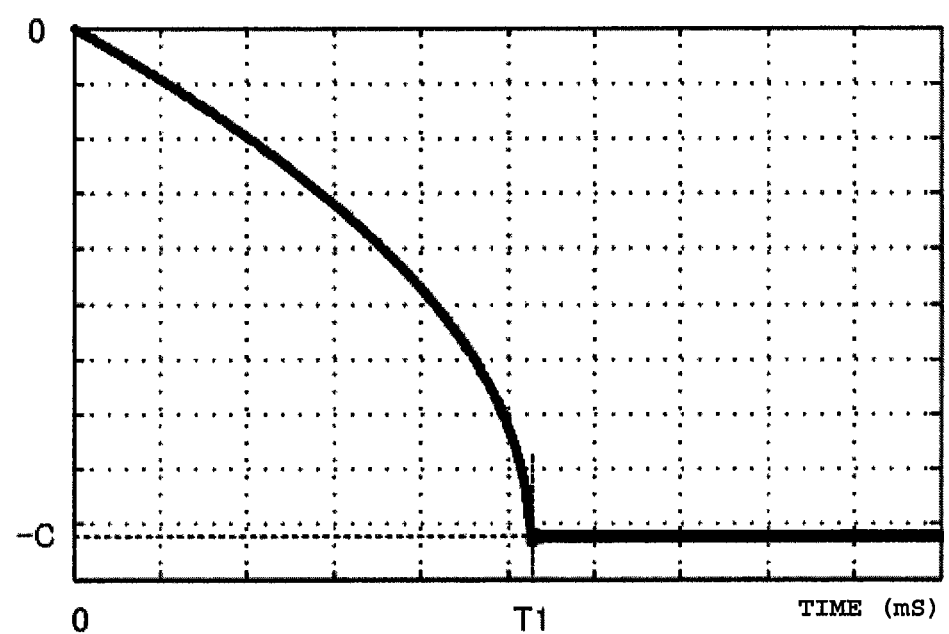

As shown in FIGS. 4A and 4B, at time 0 (mSec), noise of a predetermined frequency is applied to the feedback control system, and the amplitude value of the position error information will be ±A. At this time, the output values of the multipliers 308, 309, which represent the variable coefficients of the adaptive filter 211, are (0). At this point, the coefficients of the adaptive filter 211 are not optimized in accordance with the noise. In the predetermined time interval based on the sampling frequency of the adaptive filter 211, the output values of the multipliers 308, 309 change gradually from 0 (mSec) in the negative direction. When the elapsed time reaches the vicinity of T1 (mSec), the amplitude value of the position error information decreases rapidly, and becomes roughly ±B (|B|<|A|). Also, at this time the output values of the multipliers 308, 309 will be roughly (−C). That is, at this point the coefficients of the adaptive filter 211 are optimized corresponding to the noise. After the elapsed time crosses T1 (mSec), the amplitude value of the position error information is maintained at roughly ±B, and the value of the multipliers 308, 309 are maintained at roughly (−C). That is, even when the predetermined frequency of noise is unknown and the values of the variable coefficients of the adaptive filter 211 are not optimized, when a predetermined time elapses, it can be confirmed that the coefficients of the adaptive filter 211 are optimized. If the coefficients of the adaptive filter 211 are optimized, the amplitude value of the position error information improves and becomes smaller.

Figure 5A:
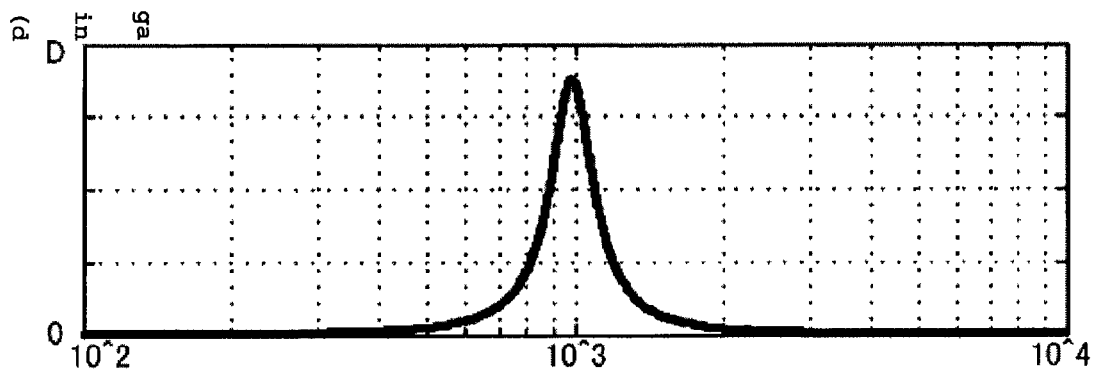
FIGS. 5A and 5B are graphs showing transfer characteristics of the adaptive filter according to the first embodiment.
Figure 5B:
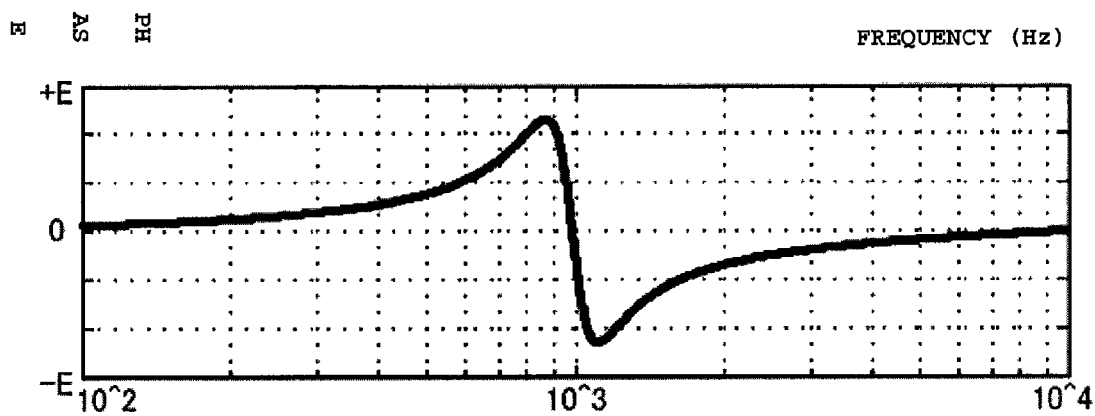

The graphs in FIGS. 5A and 5B show the transfer characteristics of the adaptive filter 211 in the state in which the variable coefficients have almost converged, after the elapsed time T1 (mSec) in FIGS. 4A and 4B. The transfer characteristics of the adaptive filter 211 according to this first embodiment will be the characteristics of the gain UP at a predetermined Q-factor at a specific frequency (the so-called reverse notch characteristics). That is, in this first embodiment, at a frequency of 1 (kHz) (as an illustrative example), the transfer characteristics, which are a gain UP amount of less than D (dB) and a phase fluctuation of ±E (deg), will be the effective characteristics corresponding to the applied noise of the predetermined frequency. In other words, from the transfer characteristics in the state in which the adaptive filter 211 is optimized, it can be estimated that the predetermined frequency of the applied noise is 1 (kHz) in this example. Also, the transfer characteristics of the adaptive filter 211, during the elapsed time 0 to T1 (mSec) interval in FIGS. 4A and 4B, are the reverse notch characteristics in the frequency band lower than 1 (kHz), and will gradually change so that the frequency nears 1 (kHz) as time elapses.

The graph shown in FIG. 6 shows the closed loop characteristics (sensitivity function) of the feedback control system in the position control process of the head, when the adaptive filter 211 is in the state of the transfer characteristics of FIGS. 5A and 5B. This transfer characteristic has a peak gain at the predetermined frequency (approximately 1 (kHz)), and it can be confirmed that it has the effect of increasing the feedback gain at this predetermined frequency. Also, the sensitivity is less than F (dB) in the bandwidth above the predetermined frequency (approximately 1 (kHz)).

In this manner, it becomes possible for the adaptive filter 211 according to this first embodiment to effectively optimize the transfer characteristics corresponding to the noise of a predetermined frequency even without using FFT. It is possible to configure this adaptive filter 211 by computations by the software modules. That is, according to the HDD 10 possessing the adaptive filter 211 according to this first embodiment, it is possible to easily configure the adaptive filter to suppress the noise of a predetermined frequency during feedback control.

Embodiment 2

Figure 7:
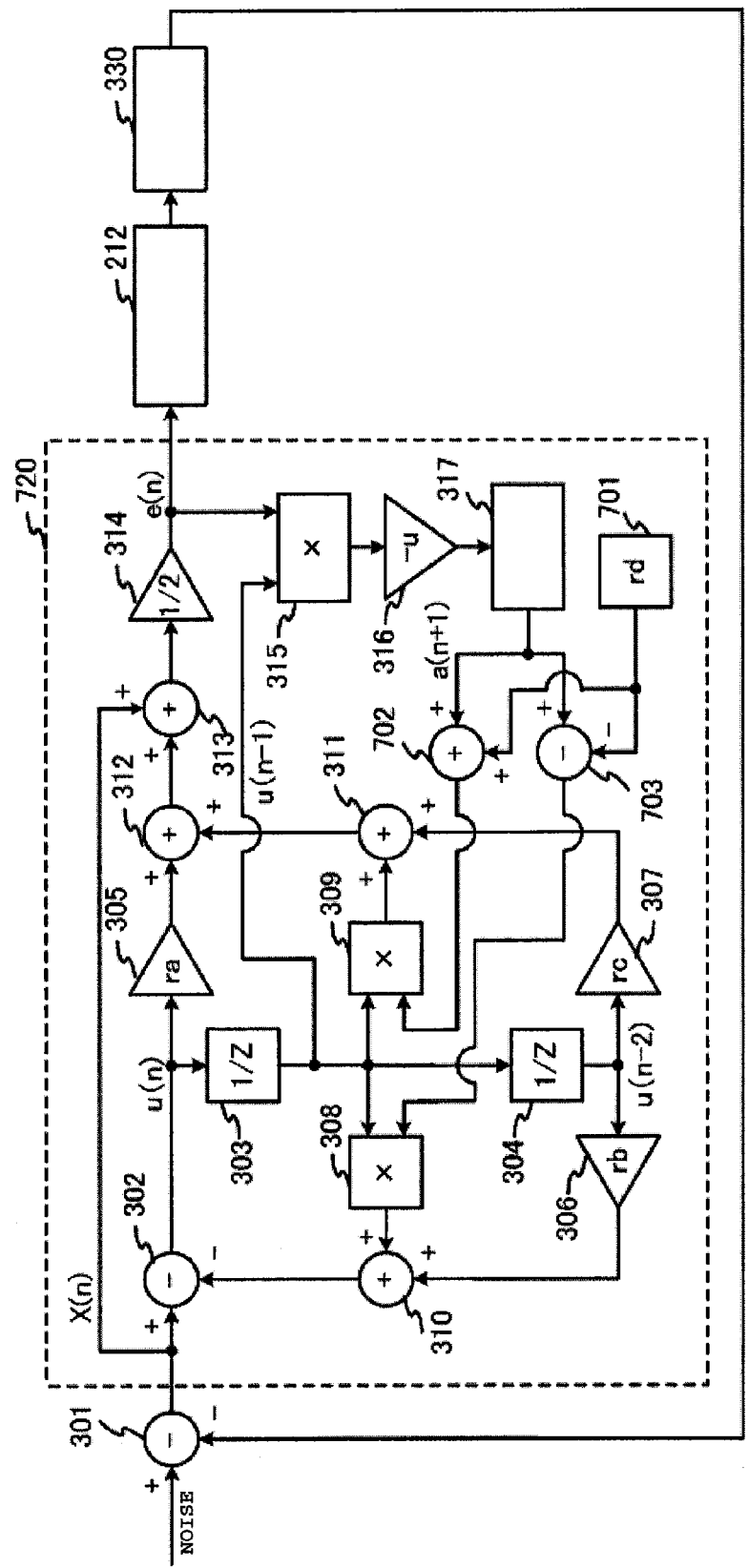
FIG. 7 is a block diagram for describing a configuration of an adaptive filter according to a second embodiment.

FIG. 7 is a block diagram for describing the configuration of an adaptive filter 720 according to this second embodiment.

This second embodiment differs from the first embodiment in the point that it uses the adaptive filter 720 in which some part of the configuration is different from that of the adaptive filter 211 according to the first embodiment described above. Therefore, from here on, a description of the configuration that is the same as the adaptive filter 211 according to the first embodiment will be simplified or omitted, and the configuration that is different will be described in detail.

The adaptive filter 720 according to this second embodiment is a software module executed in the CPU 41 described in the first embodiment. In other words, the position control process of the head according to this second embodiment will be executed by the CPU 41 in a manner similar to the first embodiment. That is, the position control process of the head according to this second embodiment will be executed by the HDD 10 in a manner similar to the first embodiment.

In FIG. 7, the schematic model of the entire feedback control system in the position control process of the head according to this second embodiment is displayed. In this feedback control system, the fixed filter 212 is provided in the subsequent stage of the adaptive filter 720 and a control target 330 is provided in the subsequent stage of the fixed filter 212. Also, the information output from the control target 330 is looped back and input to the adaptive filter 211.

Similar to the adaptive filter 211 according to the first embodiment, in the adaptive filter 720, a 2 stage IIR type of digital filter is configured. That is, the adaptive filter 720 is equipped with a 2 stage IIR type digital filter configured by the subtracter 302, the delay devices 303, 304, the adders 310, 311, 312, the coefficient (ra) 305, the coefficient (rb) 306, the coefficient (rc) 307, and the multipliers 308, 309. Also, in the subsequent stage of this 2 stage IIR type digital filter the adder 313, the coefficient 314, a multiplier 315, a coefficient (−u) 316, and an integrator 317 are connected. An output value of the integrator 317 which is the feedback value a is input to each of the adder 702 and a subtracter 703. In addition, a coefficient (rd) 701 is also input to each of the adder 702 and subtracter 703. The value obtained by adding the feedback value a and the output value of the coefficient (rd) 701 in the adder 702 is output to the multiplier 309. In the same way, a value obtained by subtracting the output value of the coefficient (rd) 701 from the feedback value a in the subtracter 703 is output to the multiplier 308. The values input to each of the multipliers 308, 309 are multiplied by the delay value u (n−1) in each of them.

Due to such a configuration, the output values of the multipliers 308, 309, which are a part of the coefficients of the 2 stage IIR type digital filter that is provided in the adaptive filter 720, are modified (updated) for every sample. That is, the adaptive filter 720 is configured as a sample value control system that determines (updates) the value to be output to the subsequent stage, in a predetermined time interval based on the sampling frequency. As a result, the characteristics of the adaptive filter 720 according to this second embodiment change for every sample.

Furthermore, while a configuration in which the fixed filter 212 is provided in the subsequent stage of the adaptive filter 720 has been described, it may also have a configuration in which the adaptive filter 720 is provided in the subsequent stage of the fixed filter 212. In addition, the adder 702 can also be configured as a subtracter, which outputs the value obtained by subtracting the output value of the coefficient (rd) 701 from the feedback value a, to the multiplier 308. In addition, the subtracter 703 can also be configured as an adder, which outputs the value obtained by adding the feedback value a to the output value of the coefficient (rd) 701, to the multiplier 309.

That is, the HDD 10 according to this second embodiment, which is equipped with an adaptive filter 720 that is configured in software modules, can easily configure the adaptive filter to suppress the noise of a predetermined frequency during feedback control.

Figure 8A:
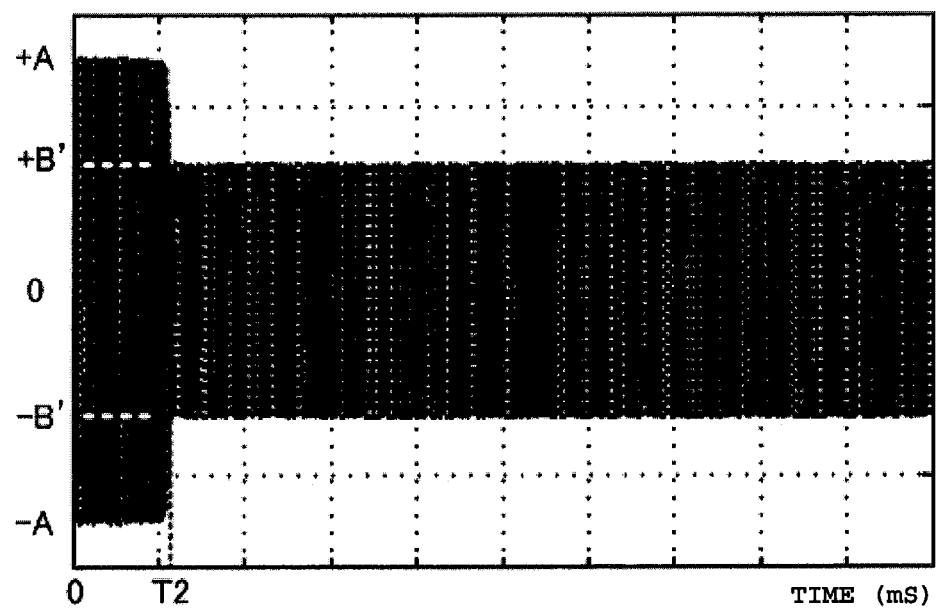
FIGS. 8A and 8B are graphs showing a change in position error information and filter coefficients relative to an elapsed time in the adaptive filter according to the second embodiment.
Figure 8B:
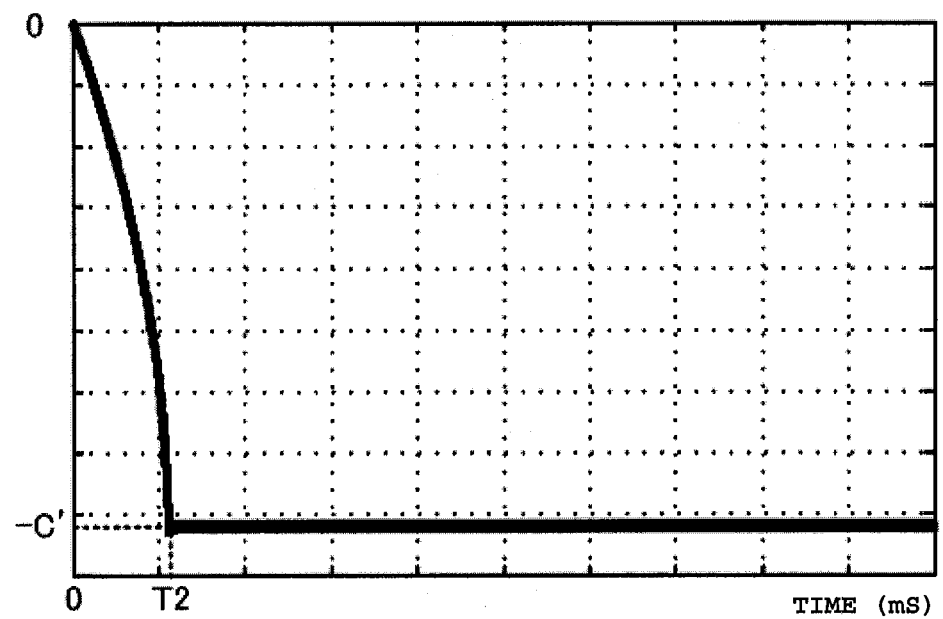
Figure 9A:
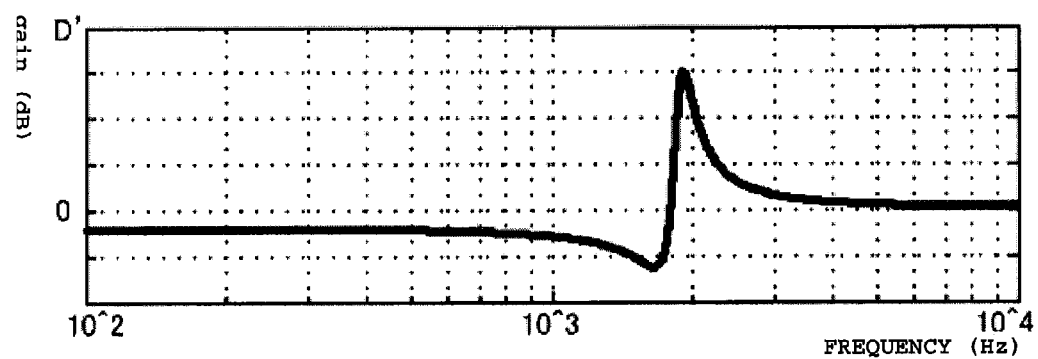
FIGS. 9A and 9B are graphs showing transfer characteristics of the adaptive filter according to the second embodiment.
Figure 9B:
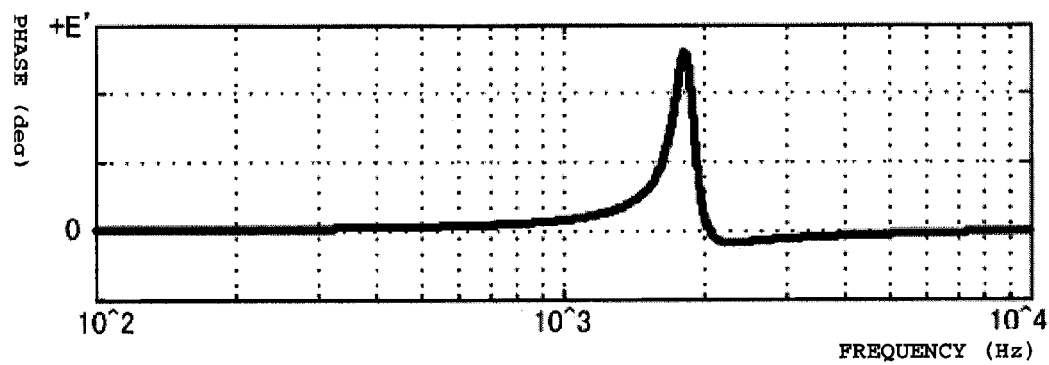
Figure 10:
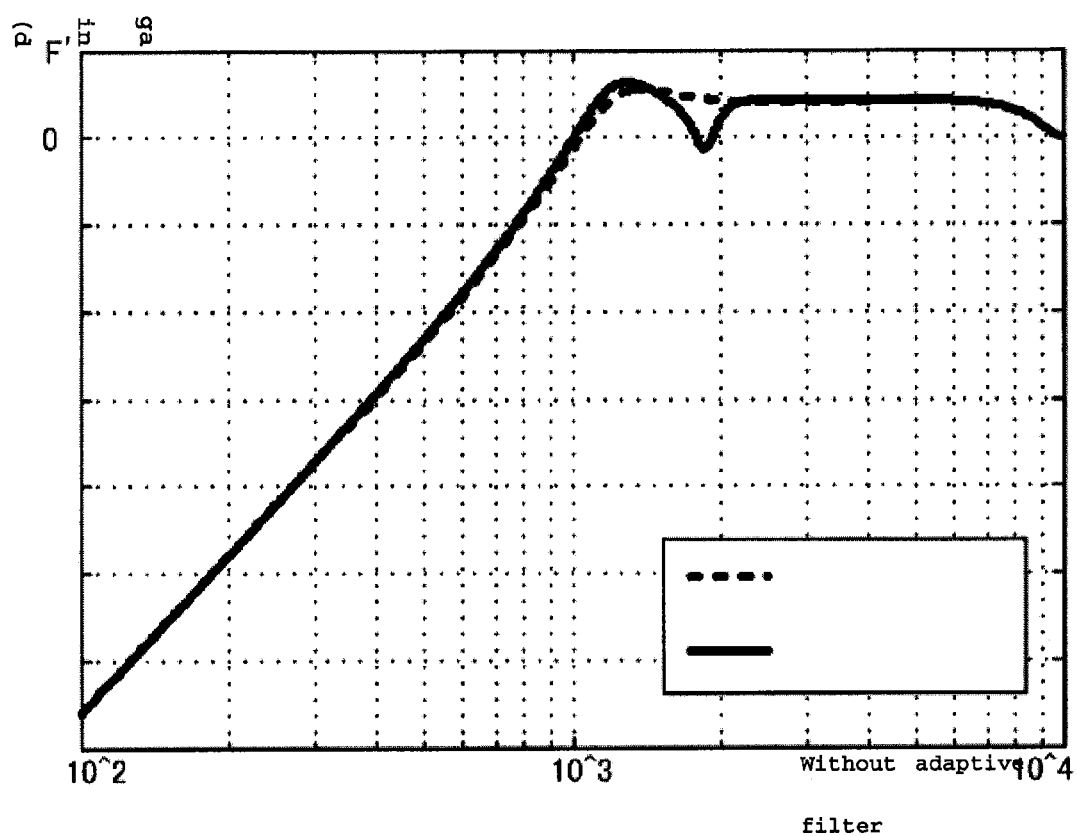
FIG. 10 is a graph showing closed loop characteristics (sensitivity characteristics) of a feedback control system, containing the adaptive filter, according to the second embodiment.

Next, the characteristics related to the adaptive filter 720, according to this second embodiment, are described using FIG. 8A to FIG. 10. FIGS. 8A and 8B are graphs that show the change in the position error information and filter coefficients with respect to the elapsed time in the adaptive filter 720 according to this second embodiment. FIGS. 9A and 9B are graphs that show the transfer characteristics of the adaptive filter 720 according to this second embodiment. FIG. 10 is a graph that shows the closed loop characteristics (sensitivity characteristics) of the feedback control system containing the adaptive filter 720 according to this second embodiment.

As shown in FIGS. 8A and 8B, at time 0 (mSec), noise of a predetermined frequency is applied to the feedback control system, and the amplitude value of the position error information will be ±A. At this time the output values of the multipliers 308, 309, which are the variable coefficients of the adaptive filter 720, are (0). At this point, the coefficients of the adaptive filter 720 are not optimized corresponding to the noise. In the predetermined time interval based on the sampling frequency of the adaptive filter 720, the output values of the multipliers 308, 309 change gradually from 0 (mSec) in the negative direction. When the elapsed time reaches the vicinity of T2 (mSec), the amplitude value of the position error information decreases rapidly, and becomes roughly ±B' (|B'|<|A|). Also, at this time the output values of the multipliers 308, 309 will be roughly (−C'). That is, at this point the coefficients of the adaptive filter 720 are optimized corresponding to the noise. After the elapsed time crosses T2 (mSec), the amplitude value of the position error information is maintained at roughly ±B' and the value of the multipliers 308, 309 are maintained at roughly (−C'). That is, even when the predetermined frequency of noise is unknown and the values of the variable coefficients of the adaptive filter 720 are not optimized, when the predetermined time elapses, it can be confirmed that the coefficients of the adaptive filter 720 are optimized. If the coefficients of the adaptive filter 720 are optimized, the amplitude value of the position error information improves and becomes smaller. The predetermined time (T2) at which the coefficients of the adaptive filter 720 according to this second embodiment are optimized is at an earlier timing than the predetermined time (T1) at which the coefficients of the adaptive filter 211 according to the first embodiment become optimized.

The graphs in FIGS. 9A and 9B show the transfer characteristics of the adaptive filter 720 in the state in which the variable coefficients have almost converged, after the elapsed time T2 (mSec) in FIGS. 8A and 8B. The transfer characteristics of the adaptive filter 720 according to this second embodiment will be the characteristics which will have a peak in phase at a specific frequency. That is, in this second embodiment, at a frequency in the vicinity of 2 (kHz) (for instance), the transfer characteristics, which are a phase UP amount of less than E' (deg) and a gain UP amount of less than D' (dB), will be the effective characteristics corresponding to the applied noise of the predetermined frequency. In other words, from the transfer characteristics in the state in which the adaptive filter 720 is optimized, it can be estimated that the predetermined frequency of the applied noise is 2 (kHz) in this particular instance. Also, the transfer characteristics of the adaptive filter 720, during the elapsed time 0 to T2 (mSec) interval in FIGS. 8A and 8B, are the characteristics which have a peak in phase in the frequency band lower than 2 (kHz), and will gradually change so that the frequency nears 2 (kHz) as time elapses.

The graph shown in FIG. 10 shows the closed loop characteristics (sensitivity function) of the feedback control system in the position control process of the head, when the adaptive filter 720 is in the state of the transfer characteristics of FIGS. 9A and 9B. The suppression ratio is greatly improved in these transfer characteristics, as compared to the closed loop characteristics (sensitivity function) according to the first embodiment, because it is possible to lower the sensitivity function gain at the predetermined frequency (approximately 2 (kHz) in one example). In addition, it is possible to improve the positioning accuracy in the bandwidth above the predetermined frequency (approximately 2 (kHz)

in this example) in the closed loop characteristics (sensitivity function) according to this second embodiment, as compared to the first embodiment. Also, the sensitivity is less than F' (dB) in the bandwidth above the predetermined frequency (approximately 1 (kHz)).

In this manner, it becomes possible for the adaptive filter 720 according to this second embodiment to effectively optimize the transfer characteristics corresponding to the noise of a predetermined frequency even without using FFT. It is possible to configure this adaptive filter 720 by computations performed by software modules. That is, with the HDD 10 that possesses the adaptive filter 720 according to this second embodiment, it is possible to easily configure the adaptive filter to suppress the noise of a predetermined frequency during feedback control.

Embodiment 3

Figure 11:
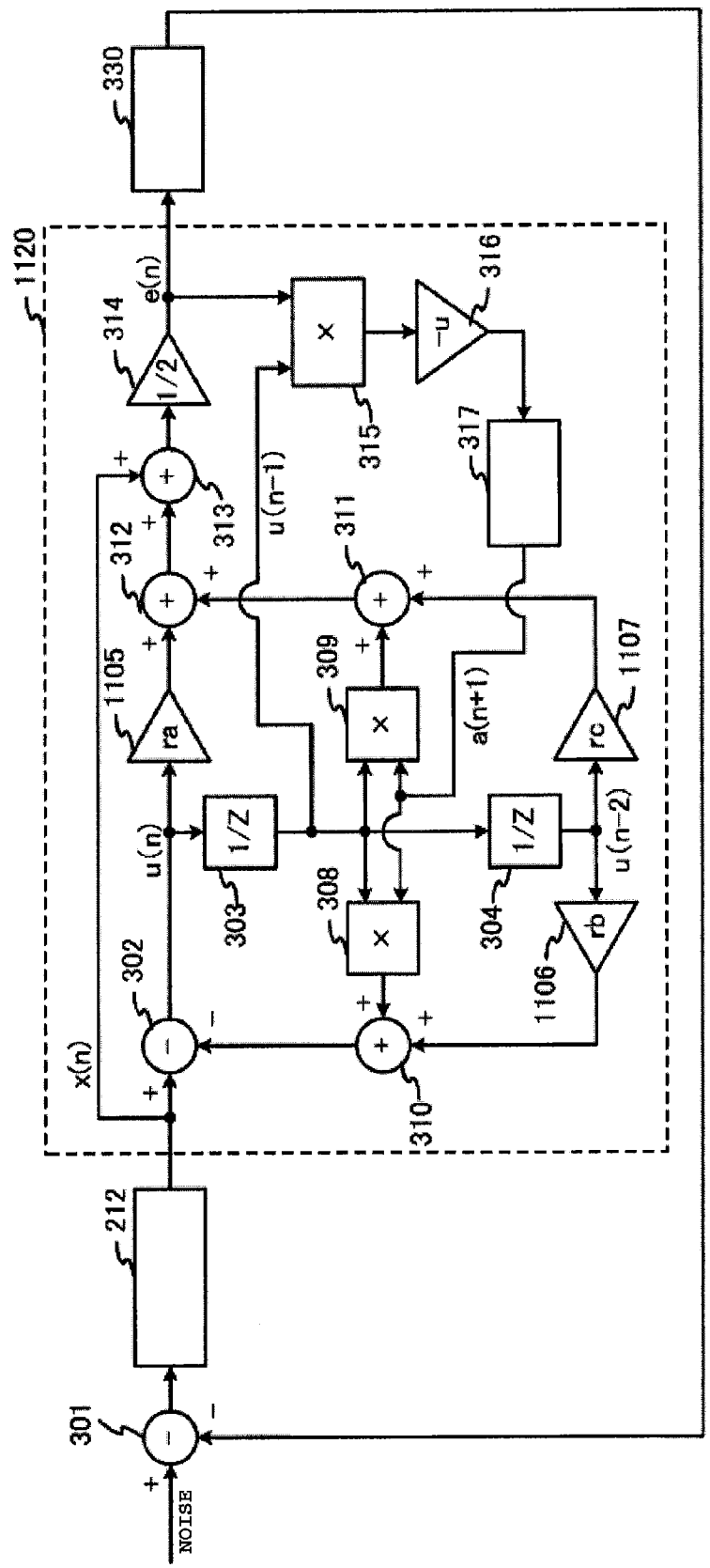
FIG. 11 is a block diagram for describing a configuration of an adaptive filter according to a third embodiment.

FIG. 11 is a block diagram for describing the configuration of an adaptive filter 1120 according to a third embodiment. The third embodiment differs from the first embodiment because it uses the adaptive filter 1120 in which some part of the configuration is different from that of the adaptive filter 211 according to the first embodiment, and the arrangement sequence of the adaptive filter 1120 and the fixed filter 212 is different. Therefore, from hereinafter, a description of the configuration that is the same as the first embodiment will be simplified or omitted, and the configuration that is different will be described in detail.

The adaptive filter 1120 according to this third embodiment is configured as a software module executed in the CPU 41 described in the first embodiment. In other words, some portion of the position control process of the head according to this third embodiment will be executed by the CPU 41 in a manner similar to the first embodiment. That is, the position control process of the head according to this third embodiment will also be executed in the HDD 10 in a manner similar to the first and second embodiments.

In FIG. 11 the schematic model of the entire feedback control system in the position control process of the head according to this third embodiment is displayed. In this feedback control system, the adaptive filter 1120 is provided in the subsequent stage of the fixed filter 212 and the control target 330 is provided in the subsequent stage of the adaptive filter 1120. The information output from the control target 330 is looped back and input to the fixed filter 212. The control target 330 contains mechanical components, and resonance may occur in these mechanical components. Due to this resonance, resonant frequency components of specific frequencies are added to the feedback control system.

Similar to the adaptive filters according to the first and second embodiments, the adaptive filter 1120 is configured by including a 2 stage IIR type digital filter. That is, the adaptive filter 1120 is equipped with a 2 stage IIR type digital filter configured by the subtracter 302, the delay devices 303, 304, the adders 310, 311, 312, a coefficient (ra) 1105, a coefficient (rb) 1106, a coefficient (rc) 1107, and the multipliers 308, 309. Also, in the subsequent stage of this 2 stage IIR type digital filter, the adder 313, the coefficient 314, the multiplier 315, the coefficient (−u) 316, and the integrator 317 are connected. These blocks are connected in a manner similar to the adaptive filters according to the first and second embodiments.

The adaptive filter 1120 according to this third embodiment is configured by including a notch filter to attenuate the gain of the specific frequency. That is, the values of the coefficient (ra) 1105, coefficient (rb) 1106, and coefficient (rc) 1107 are set such that some part of the adaptive filter 1120 configures a notch filter.

Due to such a configuration, the output values of the multipliers 308, 309, which are a part of the coefficients of the 2 stage IIR type digital filter that is provided in the adaptive filter 1120, are modified (updated) for every sample. That is, the adaptive filter 1120 is configured as a sample value control system that determines (updates) the value to be output to the subsequent stage, in a predetermined time interval based on the sampling frequency. In this third embodiment, since the output values of the multipliers 308, 309 are modified (updated) for every sample, the characteristics of the adaptive filter 1120 change for every sample.

Furthermore, while a configuration in which the adaptive filter 1120 is provided in the subsequent stage of the fixed filter 212 has been described, it may also be a configuration in which the fixed filter 212 is provided in the subsequent stage of the adaptive filter 1120. However, it is desirable that the adaptive filter 1120 is placed in a preceding stage of the control target 330 that contains the mechanical components which resonate.

That is, the HDD 10 according to this third embodiment, which is equipped with the adaptive filter 1120, can easily configure the adaptive filter to suppress the predetermined frequency components due to the resonance.

Figure 12A:
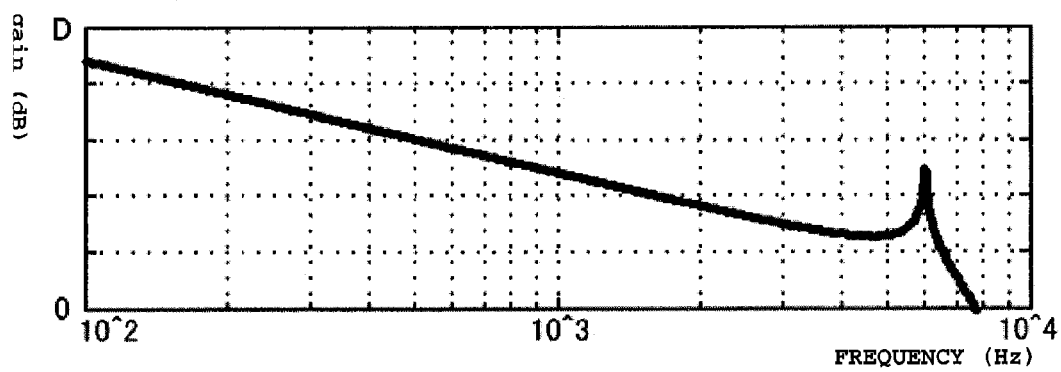
FIGS. 12A and 12B are graphs showing transfer characteristics of a control target containing mechanical components which resonate, in the third embodiment.
Figure 12B:
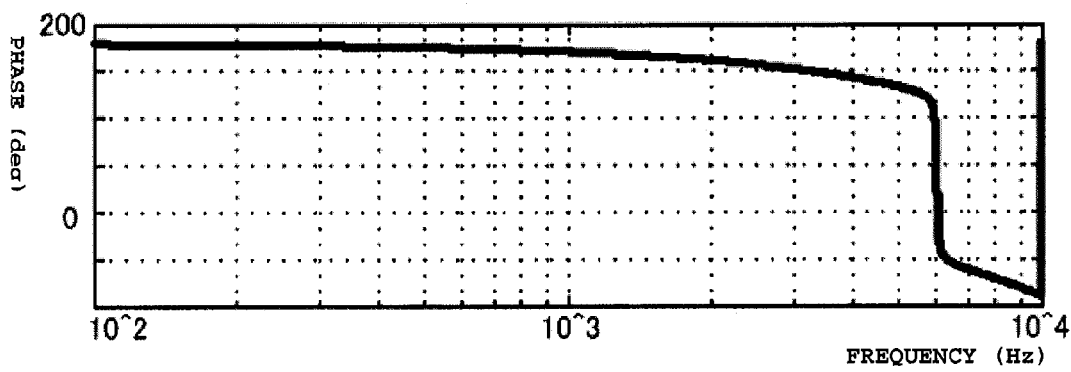
Figure 13A:
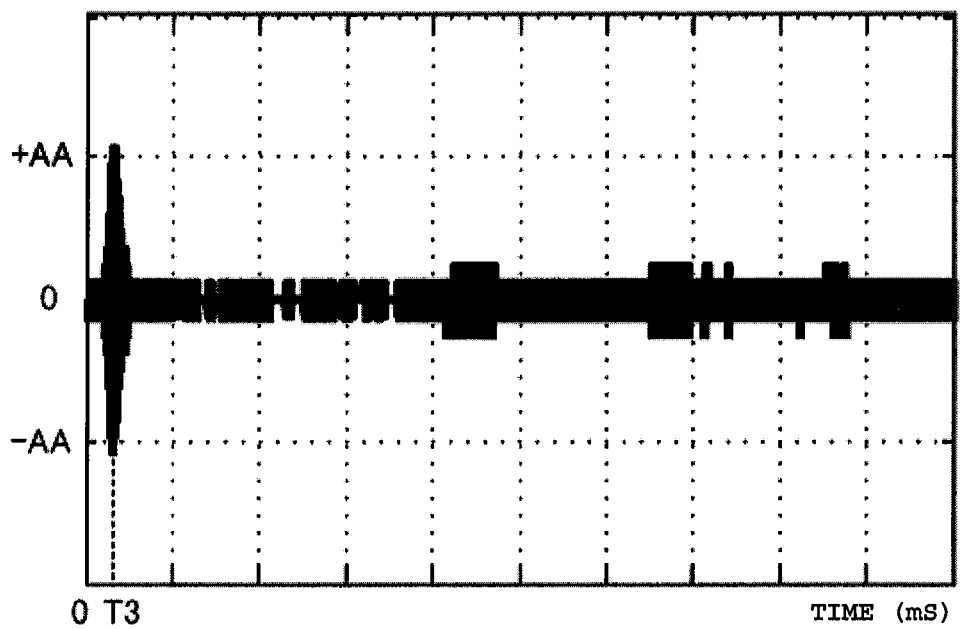
FIGS. 13A and 13B are graphs showing a change in position error information and filter coefficients relative to an elapsed time in an adaptive filter according to the third embodiment.
Figure 13B:
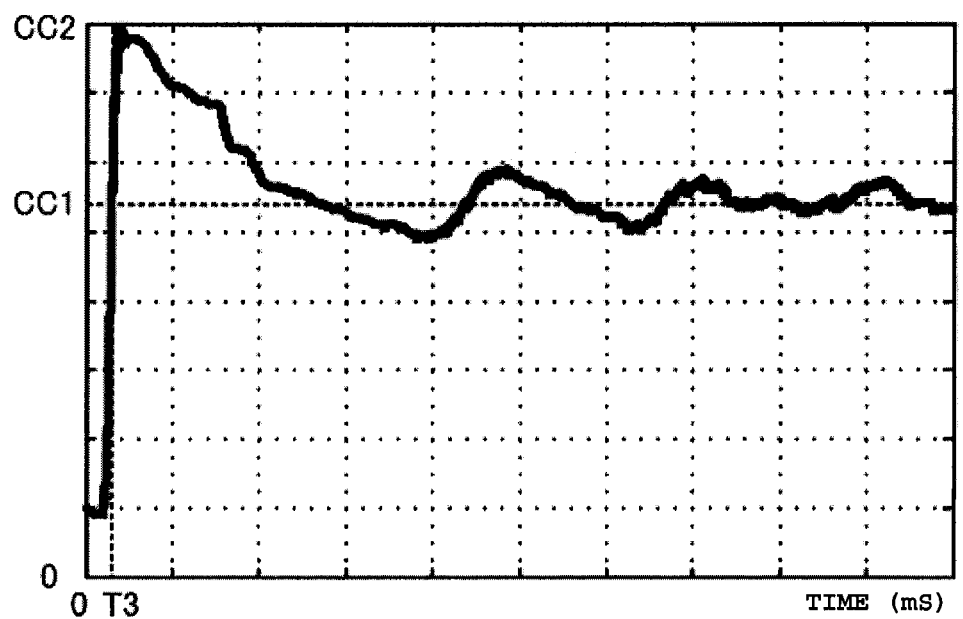
Figure 14A:
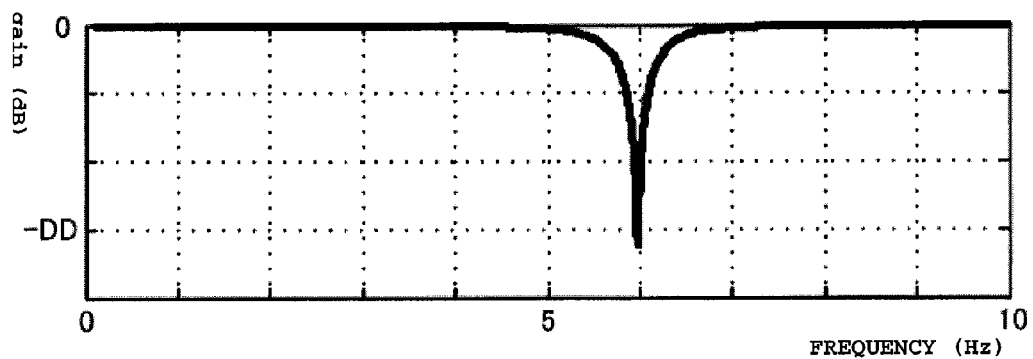
FIGS. 14A and 14B are graphs showing transfer characteristics of the adaptive filter according to the third embodiment.
Figure 14B:
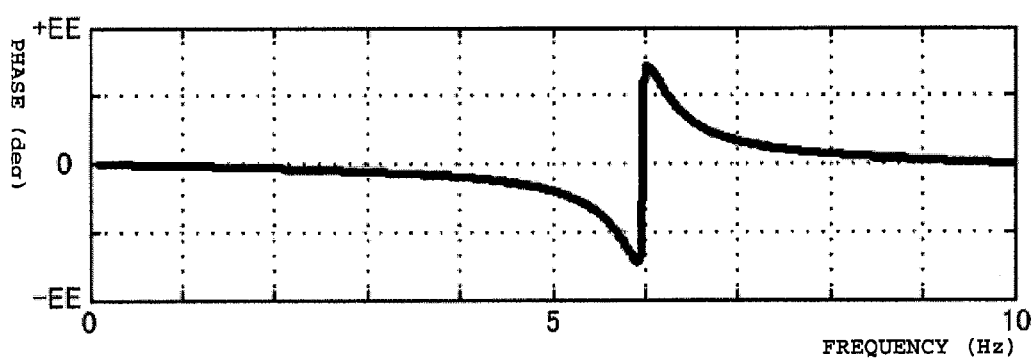

Next, the characteristics related to the adaptive filter 1120, according to this third embodiment, are described using FIG. 12A to FIG. 14B. FIGS. 12A and 12B are graphs that show the transfer characteristics of the control target 330 that contains the mechanical components which resonate, FIGS. 13A and 13B are graphs that show the change in the position error information and filter coefficients with respect to the elapsed time in the adaptive filter 1120 according to this third embodiment, FIGS. 14A and 14B are graphs that show the transfer characteristics of the adaptive filter 1120 according to this third embodiment.

As shown in FIGS. 12A and 12B, the transfer characteristics of the control target 330, which contains mechanical components which resonate, display the characteristics of a delay system, and, in an illustrative example, have resonance at the frequency in the vicinity of 6 (kHz). In addition, towards the resonant frequency, the phase gradually starts to become delayed, and at frequencies much higher than the resonant frequency the phase us delayed by 180 (deg). It is common knowledge that the transfer characteristics of the control target 330 that contains mechanical components in this manner is a delay system that has resonance.

As shown in FIGS. 13A and 13B, during the interval of time 0 (mSec) to time T3 (mSec), resonance occurs in the feedback control system, and the amplitude value of the position error information increases to the vicinity of ±AA. At this time, the output values of the multipliers 308, 309, which are the variable coefficients of the adaptive filter 1120, are increasing gradually from (0). At the point when time is 0 (mSec), the variable coefficients of the adaptive filter 1120 are not optimized corresponding to the resonance, but as the time nears T3 (mSec), the variable coefficients of the adaptive filter 1120 become optimized corresponding to the resonance. At the time T3 (mSec), when the values of the variable coefficients reach the vicinity of (CC1), the amplitude value of the position error information will decrease from the vicinity of ±AA. After the time T3 (mSec), the values of the variable coefficients will increase up to the vicinity of (CC2), but after that the variable coefficients will converge to a value in the vicinity of (CC1).

According to this third embodiment, even when the predetermined frequency of the resonance is unknown and the initial values of the variable coefficients of the adaptive filter 1120 are not optimized, when the predetermined time elapses, it can be confirmed that the variable coefficients of the adaptive filter 1120 are optimized (converge to the predetermined value). If the variable coefficients of the adaptive filter 1120 are optimized, the amplitude value of the position error information improves and becomes smaller. If the initial values of the variable coefficients of the adaptive filter 1120 are optimized values, it can be expected that the amplitude value of the position error information will remain stable.

The graphs in FIGS. 14A and 14B show the transfer characteristics of the adaptive filter 1120 in the state in which the variable coefficients have almost converged, after the elapsed time T3 (mSec) in FIGS. 13A and 13B. The transfer characteristics of the adaptive filter 1120 in this state, are the characteristics which attenuate the gain at a specific frequency (the so-called notch characteristics). That is, in this third embodiment, at a frequency in the vicinity of 6 (kHz), the transfer characteristics, which include an amount of gain attenuation less than −DD (dB) and an amount of phase fluctuation less than ±EE (deg), will be effective against the suppression of the resonance of the predetermined frequency. In other words, from the transfer characteristics in the state in which the adaptive filter 1120 is optimized, it can be estimated that the predetermined frequency of resonance is in the vicinity of (kHz). Also, the transfer characteristics of the adaptive filter 1120, during the elapsed time 0 to T3 (mSec) interval in FIGS. 13A and 13B, are notch characteristics in the frequency band lower than 6 (kHz), and will gradually change so that the frequency nears 6 (kHz) as time elapses.

In this manner, it becomes possible even for the adaptive filter 1120 according to this third embodiment to effectively optimize the transfer characteristics corresponding to the noise (resonance) of a predetermined frequency even without using FFT. It is possible to configure this adaptive filter 1120 by computations by the software modules. That is, even according to the HDD 10 possessing the adaptive filter 1120 according to this third embodiment, it is possible to easily configure the adaptive filter during feedback control.

Embodiment 4

Figure 15:
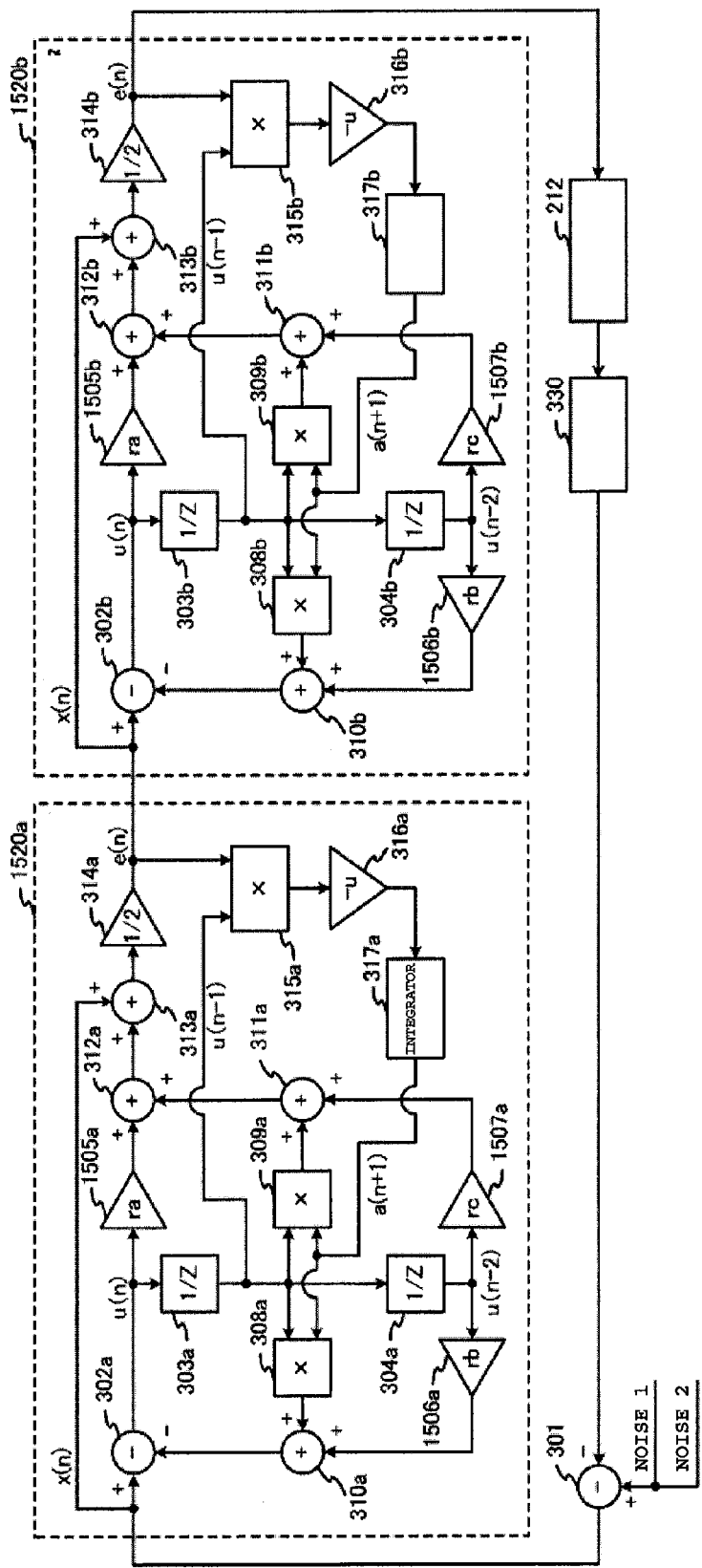
FIG. 15 is a block diagram for describing a configuration of an adaptive filter according to a fourth embodiment.

FIG. 15 is a block diagram for describing the configuration of an adaptive filter 1520 according to this fourth embodiment.

This fourth embodiment differs from the first embodiment in the point that it uses two adaptive filters 1520a, 1520b with the same configuration as the adaptive filter 211 according to the first embodiment. Therefore, from here on, a description of the configuration that is the same as the first embodiment will be simplified or omitted, and the configuration that is different will be described in detail.

The adaptive filters 1520a, 1520b according to this fourth embodiment are configured as software modules executed in the CPU 41 described in the first embodiment. In other words, some portion of the position control process of the head according to this fourth embodiment will be executed by the CPU 41 in a manner similar to the first embodiment. That is, the position control process of the head according to this fourth embodiment will also be executed in the HDD 10 in a manner similar to the first to third embodiments.

In FIG. 15 the schematic model of the entire feedback control system in the position control process of the head, according to this fourth embodiment, is displayed. In this feedback control system, two adaptive filters 1520a, 1520b are connected in series. The fixed filter 212 is provided in the subsequent stage of the adaptive filter 1520b and the control target 330 is provided in the subsequent stage of the fixed filter 212. The information output from the control target 330 is looped back and input to the adaptive filter 1520a. In FIG. 15, the model in which noise of 2 types is added to the information obtained after reversing the polarity of the position error information output from the control target 330 is shown.

Similar to the adaptive filters according to the first to third embodiments, the adaptive filter 1520a is configured by including a 2 stage IIR type digital filter. That is, the adaptive filter 1520a is equipped with the 2 stage IIR type digital filter configured by a subtracter 302a, delay devices 303a, 304a, adders 310a, 311a, 312a, a coefficient (ra) 1505a, a coefficient (rb) 1506a, a coefficient (rc) 1507a, and multipliers 308a, 309a. Also, in the subsequent stage of this 2 stage IIR type digital filter, an adder 313a, a coefficient 314a, a multiplier 315a, a coefficient (−u) 316a, and an integrator 317a are connected. These blocks are connected in a manner similar to the adaptive filters according to the first to third embodiments.

In addition, similar to the adaptive filters according to the first to third embodiments, the adaptive filter 1520b also is configured by including a 2 stage IIR type digital filter. That is, the adaptive filter 1520b is equipped with the 2 stage IIR type digital filter configured by a subtracter 302b, delay devices 303b, 304b, adders 310b, 311b, 312b, a coefficient (ra) 1505b, a coefficient (rb) 1506b, a coefficient (rc) 1507b, and multipliers 308b, 309b. Also, in the subsequent stage of this 2 stage IIR type digital filter an adder 313b, a coefficient 314b, a multiplier 315b, a coefficient (−u) 316b, and an integrator 317b are connected. These blocks are connected in a manner similar to the adaptive filters according to the first to third embodiments.

Each of the adaptive filters 1520a, 1520b according to this fourth embodiment are configured to include a reverse notch filter that increases the gain at a specific frequency. The frequency that will be the target of the reverse notch filters differs in the adaptive filter 1520a and adaptive filter 1520b. That is, the values of the coefficients (ra) 1505a, 1505b, coefficients (rb) 1506a, 1506b, and coefficients (rc) 1507a, 1507b are set such that some portion of each of the adaptive filters 1520a, 1520b configures the reverse notch filter of different specific frequencies. Each of the adaptive filters 1520a, 1520b is configured as a sample value control system that determines (updates) the value to be output to the subsequent stage, in a predetermined time interval based on the sampling frequency. In this fourth embodiment since the output values of the multipliers 308a, 308b, 309a, 309b are modified (updated) for every sample, the characteristics of each of the adaptive filters 1520a, 1520b change for every sample.

Furthermore, while the configuration in which the adaptive filters 1520a, 1520b are connected in series and the fixed filter 212 is provided in the subsequent stage of the adaptive filter 1520b has been described, it need not be limited to this configuration. For example, it may also be a configuration in which the fixed filter 212 is provided between the adaptive filters 1520a, 1520b, or a configuration in which the adaptive filters 1520a, 1520b are connected in series and the fixed filter 212 is provided in the preceding stage of the adaptive filter 1520a. In addition, it may also be a configuration provided with not just two adaptive filters 1520a, 1520b, but also 3 or more adaptive filters.

That is, the HDD 10 according to this fourth embodiment, which is equipped with adaptive filters 1520a, 1520b can easily configure the adaptive filters to suppress the noise of multiple different predetermined frequencies.

Figure 16A:
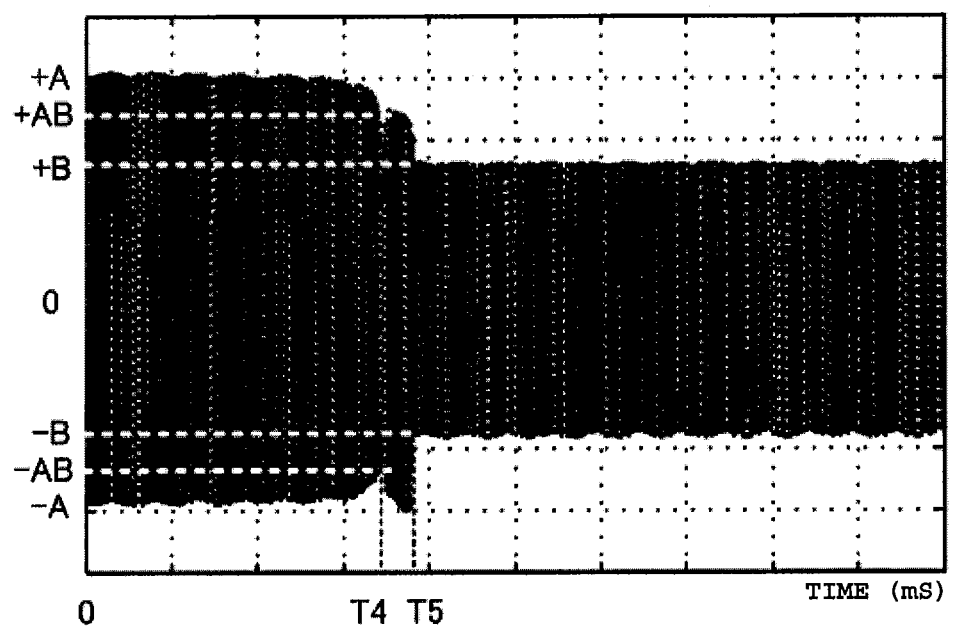
FIGS. 16A and 16B are graphs showing a change in position error information and filter coefficients relative to an elapsed time in an adaptive filter according to the fourth embodiment.
Figure 16B:
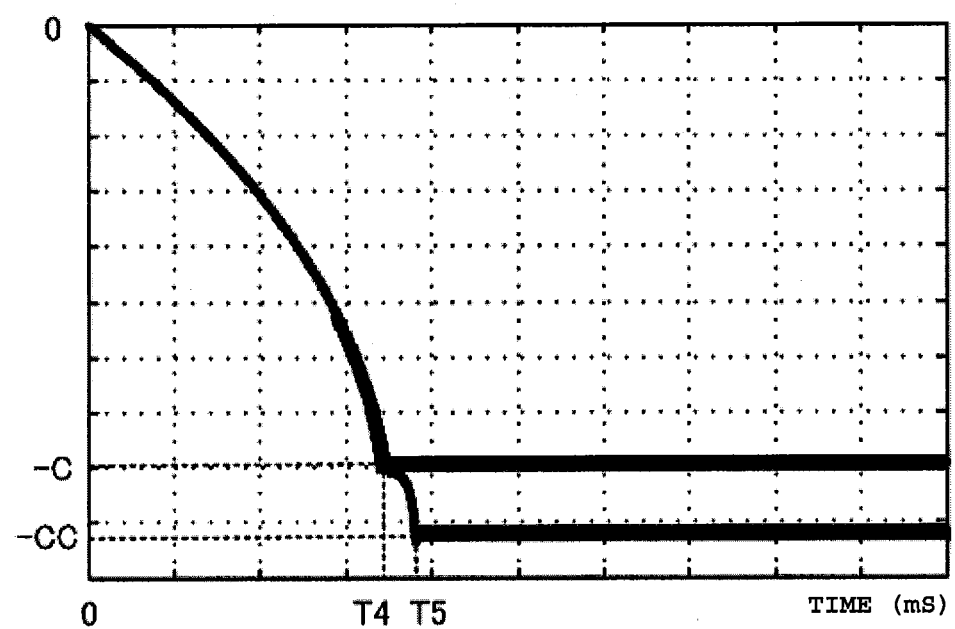
Figure 17A:
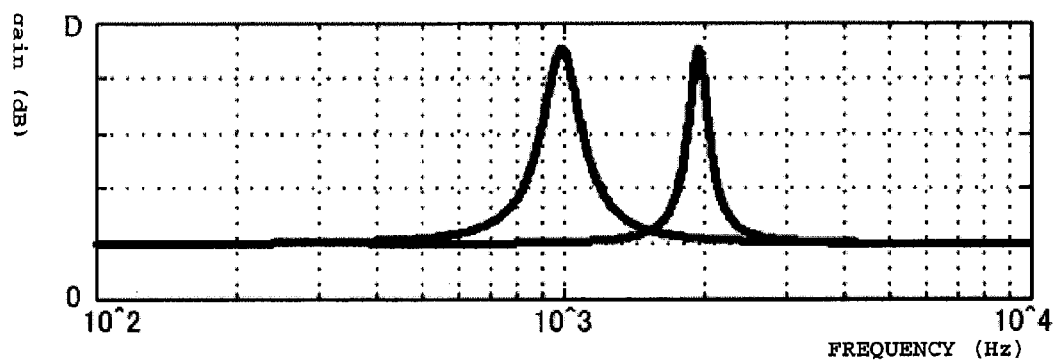
FIGS. 17A and 17B are graphs showing transfer characteristics of the adaptive filter according to the fourth embodiment.
Figure 17B:
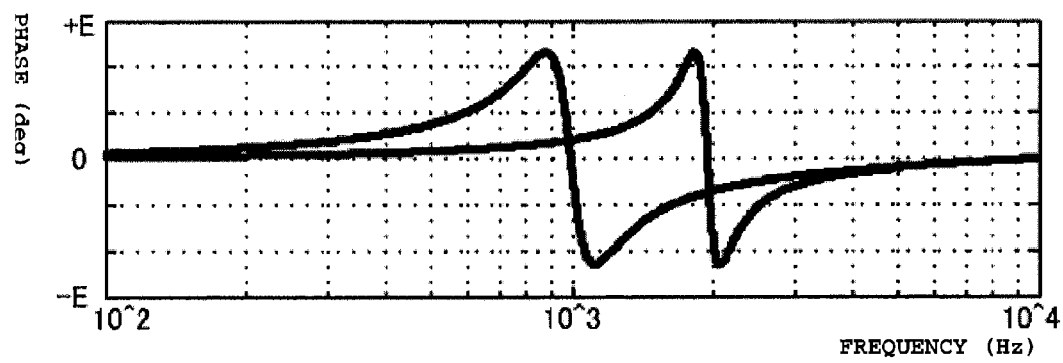
Figure 18:
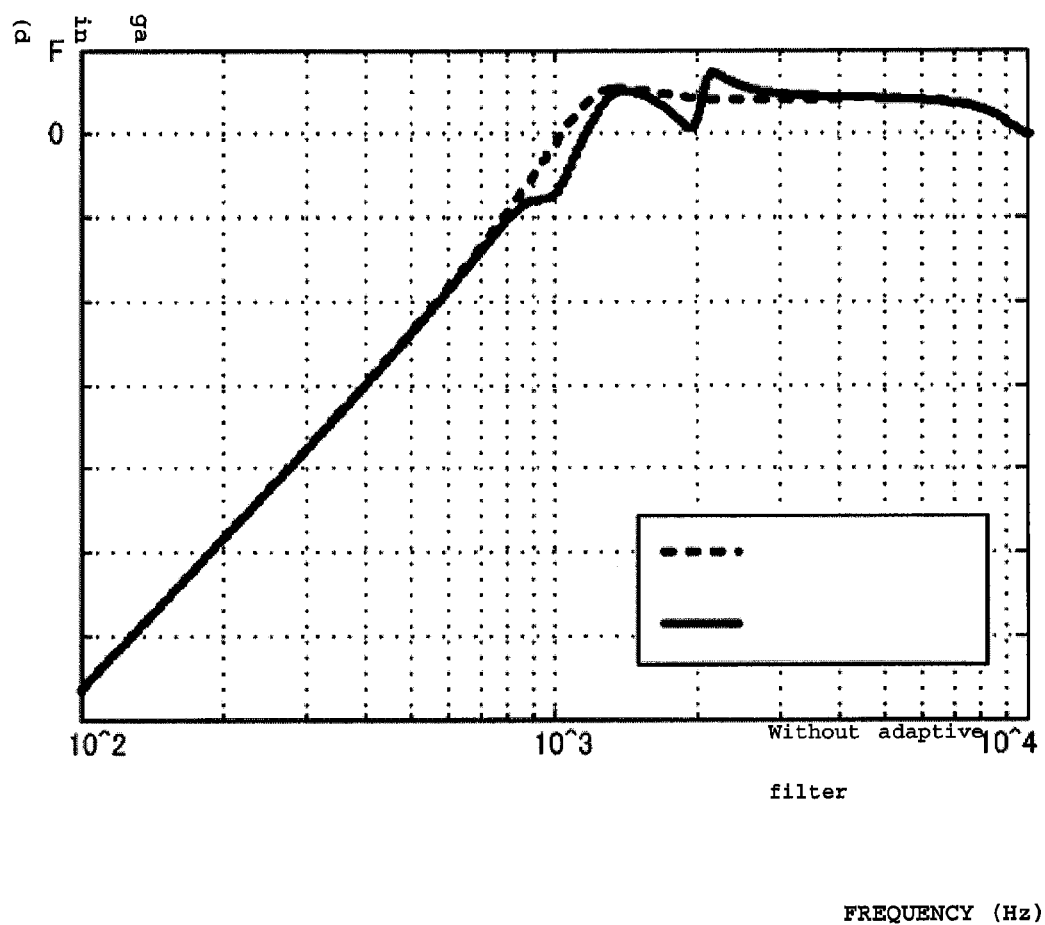
FIG. 18 is a graph showing closed loop characteristics (sensitivity characteristics) of a feedback control system, containing the adaptive filter, according to the fourth embodiment.

Next, the characteristics related to the adaptive filters 1520a, 1520b according to this fourth embodiment are described using FIG. 16A to FIG. 18. FIGS. 16A and 16B are graphs that show the change in the position error information and filter coefficients with respect to the elapsed time in the adaptive filters 1520a, 1520b according to this fourth embodiment, FIGS. 17A and 17B are graphs that show the transfer characteristics of the adaptive filters 1520a, 1520b according to this fourth embodiment. FIG. 18 is a graph that shows the closed loop characteristics (sensitivity characteristics) of the feedback control system containing the adaptive filters 1520a, 1520b according to this fourth embodiment.

As shown in FIGS. 16A and 16B, at time 0 (mSec), noise of two different predetermined frequencies are applied to the feedback control system, and the amplitude value of the position error information will be ±A. At this time the output values of the multipliers 308a, 308b, 309a, 309b, which are the variable coefficients of each of the adaptive filters 1520a, 1520b, are (0). At this point, the coefficients of the adaptive filters 1520a, 1520b are not optimized corresponding to the noise. In each of the predetermined time intervals based on the sampling frequencies of the adaptive filters 1520a, 1520b, the output values of the multipliers 308a, 308b, 309a, 309b change gradually from 0 (mSec) in the negative direction. When the elapsed time reaches the vicinity of T4 (mSec), the amplitude value of the position error information becomes small, and will be roughly ±AB (|AB|<|A|). Also, at this time the output values of the multipliers 308a, 309a related to the adaptive filter 1520a will be roughly (−C). That is, at this point the coefficients of the adaptive filter 1520a will be in a state wherein they are optimized corresponding to the noise of the first specific frequency.

The amplitude value of the position error information becomes even smaller after the elapsed time T4 (mSec), and will be roughly ±B (|B|<|A|) in the vicinity of T5 (mSec). In addition, at this time, while the output values of the multipliers 308a, 309a, related to the adaptive filter 1520a will be maintained at roughly (−C), the output values of the multipliers 308b, 309b related to the adaptive filter 1520b will become roughly (−CC). That is, at this point, it will be a state in which, along with the coefficients of the adaptive filter 1520a being optimized corresponding to the noise of the first specific frequency, the coefficients of the adaptive filter 1520b will be optimized corresponding to the noise of the second specific frequency. After the elapsed time crosses T5 (mSec), the amplitude value of the position error information is maintained at roughly ±B, the value of the multipliers 308a, 309a related to the adaptive filter 1520a are maintained at roughly (−C), and the output values of the multipliers 308b, 309b related to the adaptive filter 1520b are maintained at roughly (−CC).

That is, according to this fourth embodiment, even when the predetermined frequencies of noise are unknown and the initial values of the variable coefficients of each of the adaptive filters 1520a, 1520b are not optimized, when the predetermined time elapses, it can be confirmed that the coefficients of each of the adaptive filters 1520a, 1520b are optimized (converge to a specific value). If the coefficients of each of the adaptive filters 1520a, 1520b are optimized, the amplitude value of the position error information improves and becomes smaller.

The graphs in FIGS. 17A and 17B show the transfer characteristics of each of the adaptive filters 1520a, 1520b in the state in which the variable coefficients have converged to a predetermined value, after the elapsed time T5 (mSec) in FIGS. 16A and 16B. The transfer characteristics of each of the adaptive filters 1520a, 1520b in this state will be the characteristics (the so-called reverse notch characteristics) which increase the gain at a predetermined Q-factor at the specific frequencies. That is, in this fourth embodiment, in an illustrative example, at a frequency of 1 (kHz), the transfer characteristics, which will be an UP in gain amount of equal to or less than D (dB) and a phase fluctuation of ±E (deg), will be the effective characteristics corresponding to the applied noise of the first predetermined frequency. In addition, at a frequency of 2 (kHz), the transfer characteristics, which will be an UP in gain amount of equal to or less than D (dB) and a phase fluctuation of ±E (deg), will be the effective characteristics corresponding to the applied noise of the second predetermined frequency. In other words, from the transfer characteristics in the state in which each of the adaptive filters 1520a, 1520b are optimized, it can be estimated that among the multiple noise applied, the first predetermined frequency is 1 (kHz) in this example, and the second predetermined frequency is 2 (kHz) in this example.

In addition, in FIGS. 16A and 16B, the transfer characteristics of the adaptive filter 1520a in the elapsed time interval 0 to T4 (mSec) are the reverse notch characteristics in the frequency band lower than 1 (kHz), and will gradually change so that the frequency nears 1 (kHz) as time elapses. Also, the transfer characteristics of the adaptive filter 1520b in the elapsed time interval 0 to T5 (mSec) are the reverse notch characteristics in the frequency band lower than 2 (kHz), and will gradually change so that the frequency nears 2 (kHz) as time elapses.

The graph shown in FIG. 18 shows the closed loop characteristics (sensitivity function) of the feedback control system in the position control process of the head, when each of the adaptive filters 1520a, 1520b are in the state of the transfer characteristics of FIGS. 17A and 17B. In the transfer characteristics of FIGS. 17A and 17B, at the first predetermined frequency (e.g., approximately 1 (kHz)) and second predetermined frequency (e.g., approximately 2 (kHz)), there is a peak in the gain. That is, the transfer characteristics according to this fourth embodiment have the effect of increasing the feedback gain at both these predetermined frequencies. Hence, in the sensitivity function shown in FIG. 18, it can be confirmed that the sensitivity of the first predetermined frequency (e.g., approximately 1 (kHz)) and second predetermined frequency (e.g., approximately 2 (kHz)) has decreased. In addition, the sensitivity in the bands above the second predetermined frequency (e.g., approximately 2 (kHz)) is lower than F (dB).

In this manner, it becomes possible for the adaptive filters 1520a, 1520b according to this fourth embodiment to effectively optimize the transfer characteristics corresponding to the noise of multiple predetermined frequencies even without using FFT. It is possible to configure these adaptive filters 1520a, 1520b by computations performed by the software modules. That is, according to the HDD 10 possessing adaptive filters 1520a, 1520b according to this fourth embodiment, it is possible to easily configure the adaptive filters to suppress the noise components of multiple predetermined frequencies during feedback control.

As described above, according to the first to fourth embodiments, it becomes possible to realize an adaptive filter that adaptively estimates the random frequency components of the applied noise in the feedback control system, by using a digital filter that uses software modules. This adaptive filter is realized not by using FFT but by programs that are executed in the CPU. That is, according to the first to fourth embodiments, it becomes possible to provide a magnetic disk device and head-position control method that employs an adaptive filter that can be easily configured to suppress the noise of a specific frequency in the feedback control system.

Furthermore, in the electronic equipment 150 shown in FIG. 1, the vibrations that occur due to audio signals that are output from the speakers (not shown) set up in the electronic equipment 150 can be cited as a cause of the noise of predetermined frequencies that is applied towards the HDD 10. In addition, the vibrations that propagate to the HDD 10 based on the vibrations that is applied to the chassis that supports the HDD 10 inside the electronic equipment 150 can also be assumed to be a cause.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk on which servo information is recorded;
a head to read the servo information on the magnetic disk;
a position control module comprising a high-order adaptive digital filter containing first and second variable coefficients that are each based on position error information generated from the servo information read by the head and
an integrator configured to integrate, at the time of carrying out positioning control of the head, a first value that is obtained by multiplying, by a first factor, a second value obtained by multiplying an output value of the high-order adaptive digital filter and a third value derived from a first delayed sample of the position error information,
wherein each of the first and second variable coefficients is obtained by multiplying a value generated by the integrator with the third value.

2. The magnetic disk device of claim 1, wherein the output value of the high-order adaptive digital filter is derived based on a difference between a noise signal and the position error information and a value that is a sum of the second variable coefficient and a seventh value, the seventh value being derived from a second delayed sample of the position error information, multiplied by a third factor.

3. The magnetic disk device of claim 1, wherein the output value of the high-order adaptive digital filter is derived from a fourth value that is obtained based on a difference between a noise signal and the position error information.

4. The magnetic disk device of claim 3, wherein the output value of the high-order adaptive digital filter is further based on a fifth value derived from an undelayed sample of the position error information.

5. The magnetic disk device of claim 4, wherein the output value of the high-order adaptive digital filter is equal to one-half of a sum of the fourth value, the fifth value multiplied by a second factor, and a sixth value that is a sum of the second variable coefficient and a seventh value, the seventh value being derived from a second delayed sample of the position error information, multiplied by a third factor.

6. The magnetic disk device of claim 1, wherein each of the first and the second variable coefficients is obtained by multiplying the third value with an eighth value that is a sum of the value generated by the integrator and a fourth factor.

7. A magnetic disk device comprising: a magnetic disk on which servo information is recorded, a head to read the servo information on the magnetic disk, a position control module comprising first and second high-order adaptive filters that are arranged such that an output of one is connected to an input to the other, each of first and second high-order adaptive filters containing first and second variable coefficients that are each based on the position error information generated from the servo information read by the head,
wherein the position control module, at the time of carrying out positioning control of the head, integrates a first value that is obtained by multiplying, by a first factor, a second value obtained by multiplying an output value of the respective high-order adaptive digital filter and a third value derived from a first delayed sample of the position error information, and the first and second variable coefficients are obtained by multiplying a value generated by the integrator with the third value.

8. The magnetic disk device of claim 7, wherein the output value of the high-order adaptive digital filter is derived based on a difference between a noise signal and the position error information and a value that is a sum of the second variable coefficient and a seventh value, the seventh value being derived from a second delayed sample of the position error information, multiplied by a third factor.

9. The magnetic disk device of claim 7, wherein the output value of the respective high-order adaptive digital filter is derived from a fourth value that is obtained based on a difference between a noise signal and the position error information.

10. The magnetic disk device of claim 9, wherein the output value of the respective high-order adaptive digital filter is further based on a fifth value derived from an undelayed sample of the position error information.

11. The magnetic disk device of claim 10, wherein the output value of the respective high-order adaptive digital filter is equal to one-half of a sum of the fourth value, the fifth value multiplied by a second factor, and a sixth value that is a sum of the second variable coefficient and a seventh value, the seventh value being derived from a second delayed sample of the position error information, multiplied by a third factor.

12. The magnetic disk device of claim 7, wherein the second variable coefficient is obtained by multiplying the third value with an eighth value that is a sum of the value generated by the integrator and a fourth factor.

13. A position control method in a magnetic disk device comprising a magnetic disk on which servo information is recorded, a head to read the servo information on the magnetic disk, and a high-order adaptive digital filter, the method comprising:
filtering an output value of the high-order adaptive digital filter to obtain position error information;
feeding back the position error information to the high-order adaptive digital filter; and
adjusting first and second variable coefficients of the high-order adaptive digital filter based on noise and the position error information that was fed back,
wherein a first value, which is obtained by multiplying, by a first factor, a second value obtained by multiplying the output value of the high-order adaptive digital filter and a third value derived from a first delayed sample of the position error information, is integrated to generate an integrated value, and wherein the first and the second variable coefficients are obtained by multiplying the integrated value with the third value.

14. The position control method of claim 13, wherein the output value of the high-order adaptive digital filter is derived from a fourth value that is obtained based on a difference between a noise signal and the position error information.

15. The position control method of claim 14, wherein the output value of the high-order adaptive digital filter is further based on a fifth value derived from an undelayed sample of the position error information.

16. The position control method of claim 15, wherein the output value of the high-order adaptive digital filter is equal to one-half of a sum of the fourth value, the fifth value multiplied by a second factor, and a sixth value that is a sum of the second variable coefficient and a seventh value, the seventh value being derived from a second delayed sample of the position error information, multiplied by a third factor.

17. The position control method of claim 16, wherein each of the first and the second variable coefficient is obtained by multiplying the third value with an eighth value that is a sum of the integrated value and a fourth factor.

* * * * *